(12) United States Patent
Osuki et al.

(10) Patent No.: US 12,054,797 B2
(45) Date of Patent: Aug. 6, 2024

(54) AUSTENITIC STAINLESS STEEL MATERIAL AND WELDED JOINT

(71) Applicant: NIPPON STEEL CORPORATION, Tokyo (JP)

(72) Inventors: Takahiro Osuki, Tokyo (JP); Yuhei Suzuki, Tokyo (JP); Shohgo Aota, Tokyo (JP); Hirokazu Okada, Tokyo (JP); Masahiro Seto, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 422 days.

(21) Appl. No.: 17/597,682

(22) PCT Filed: Jul. 22, 2020

(86) PCT No.: PCT/JP2020/028586
§ 371 (c)(1),
(2) Date: Jan. 18, 2022

(87) PCT Pub. No.: WO2021/015283
PCT Pub. Date: Jan. 28, 2021

(65) Prior Publication Data
US 2022/0259688 A1    Aug. 18, 2022

(30) Foreign Application Priority Data

Jul. 25, 2019 (JP) ................. 2019-136668
Jul. 25, 2019 (JP) ................. 2019-136669

(51) Int. Cl.
*C22C 38/00* (2006.01)
*C21D 6/00* (2006.01)
(Continued)

(52) U.S. Cl.
CPC ............. *C21D 8/005* (2013.01); *C21D 6/004* (2013.01); *C21D 6/005* (2013.01); *C21D 6/007* (2013.01);
(Continued)

(58) Field of Classification Search
None
See application file for complete search history.

(56) References Cited

U.S. PATENT DOCUMENTS 8,865,060 B2    10/2014    Osuki et al.
9,714,459 B2 *   7/2017    Inoue ................. C22C 38/54
(Continued)

FOREIGN PATENT DOCUMENTS

JP    2003166039 A    6/2003
WO   2009044802 A1   4/2009
(Continued)

*Primary Examiner* — Daniel J Wiley
(74) *Attorney, Agent, or Firm* — Greer Burns & Crain Ltd.

(57) ABSTRACT

An austenitic stainless steel material is provided that has excellent sensitization resistance properties even after use for a long time period at an average operation temperature of 400 to 700° C. after welding with higher heat input. The steel material of the present disclosure has a chemical composition which contains, in mass %, C: 0.020% or less, Si: 1.50% or less, Mn: 2.00% or less, P: 0.045% or less, S: 0.0300% or less, Cr: 15.00 to 25.00%, Ni: 9.00 to 20.00%, N: 0.05 to 0.15%, Nb: 0.1 to 0.8%, Mo: 0.10 to 4.50%, and W: 0.01 to 1.00%, and satisfies Formula (1). The content of Nb in a residue obtained by an extraction residue method is, in mass %, 0.050 to 0.267%, and the content of Cr in the residue is, in mass %, 0.125% or less.

$$21.9Mo+5.9W-5.0 \geq 0 \quad (1).$$

5 Claims, 2 Drawing Sheets

(51) Int. Cl.
    *C21D 8/00*     (2006.01)
    *C22C 38/02*     (2006.01)
    *C22C 38/04*     (2006.01)
    *C22C 38/06*     (2006.01)
    *C22C 38/42*     (2006.01)
    *C22C 38/44*     (2006.01)
    *C22C 38/46*     (2006.01)
    *C22C 38/48*     (2006.01)
    *C22C 38/50*     (2006.01)
    *C22C 38/52*     (2006.01)
    *C22C 38/54*     (2006.01)
    *B23K 103/04*     (2006.01)

(52) U.S. Cl.
    CPC ............ *C21D 6/008* (2013.01); *C22C 38/001* (2013.01); *C22C 38/002* (2013.01); *C22C 38/008* (2013.01); *C22C 38/02* (2013.01); *C22C 38/04* (2013.01); *C22C 38/06* (2013.01); *C22C 38/42* (2013.01); *C22C 38/44* (2013.01); *C22C 38/46* (2013.01); *C22C 38/48* (2013.01); *C22C 38/50* (2013.01); *C22C 38/52* (2013.01); *C22C 38/54* (2013.01); *B23K 2103/04* (2018.08); *C21D 2211/001* (2013.01)

(56) References Cited

U.S. PATENT DOCUMENTS

| | | | |
|---|---|---|---|
| 10,519,533 B2* | 12/2019 | Iseda | ......................... C21D 9/08 |
| 2010/0034689 A1* | 2/2010 | Hirata | ...................... C22C 38/52 |
| | | | 420/49 |
| 2010/0054983 A1* | 3/2010 | Osuki | ..................... C22C 38/40 |
| | | | 420/36 |
| 2014/0356641 A1* | 12/2014 | Miyamura | ............... C22C 38/46 |
| | | | 420/38 |
| 2019/0144981 A1 | 5/2019 | Seto et al. | |
| 2019/0194787 A1 | 6/2019 | Okada et al. | |

FOREIGN PATENT DOCUMENTS

| | | |
|---|---|---|
| WO | 2017175839 A1 | 10/2017 |
| WO | 2018043565 A1 | 3/2018 |

\* cited by examiner 100  200  100

100  200  100

100

100

AUSTENITIC STAINLESS STEEL MATERIAL AND WELDED JOINT

TECHNICAL FIELD

The present disclosure relates to a steel material, and more specifically relates to an austenitic stainless steel material and a welded joint that uses the austenitic stainless steel material.

BACKGROUND ART

A steel material that is used in chemical plant facilities such as oil refinery plants and petrochemical plants is required to have high temperature strength. An austenitic stainless steel material is used as a steel material for use in these chemical plant facilities.

A petrochemical plant includes a plurality of apparatuses. The respective apparatuses included in a petrochemical plant are, for example, a crude distillation unit, a vacuum distillation unit, a direct desulfurization unit, and a catalytic reforming unit. These apparatuses include a heating furnace pipe, a reactor, a tank, a heat exchanger, piping and the like. These apparatuses are welded structures formed by welding a steel material.

The average temperatures during operation of the respective apparatuses differ from each other. Hereinafter, the average temperature during operation is referred to as an "average operation temperature". For example, a vacuum distillation unit is operated in the range of 400 to 450° C. A direct desulfurization unit is operated in the range of 400 to 450° C. A catalytic reforming unit is operated in the range of 420 to 700° C. Therefore, a steel material that is used for a heating furnace pipe, a reactor, a tank, a heat exchanger, or piping or the like of these apparatuses may be held for a long time period at an average operation temperature within the range of around 400 to 700° C. during operation of these apparatuses. Note that, the apparatuses in a petrochemical plant also include apparatuses that operate at temperatures of more than 700° C.

In addition, when newly constructing a petrochemical plant or repairing a petrochemical plant, the steel material that is used for the apparatuses in the petrochemical plant is welded at the planned construction site of the chemical plant or at the site where the chemical plant is located. In recent welding work, in order to reduce the number of welding passes, there are many cases in which welding with higher heat input for which the heat input is made large is adopted.

In this connection, it is known that when an austenitic stainless steel material has been welded, sensitization which is attributable to Cr carbides occurs in a heat affected zone (hereinafter, also referred to as a "HAZ" (heat affected zone)). When sensitization occurs, dissolved Cr is depleted from the grain boundaries. Such a region in which dissolved Cr is depleted is referred to as a "Cr depleted zone". Cr depleted zones near grain boundaries cause intergranular corrosion and stress-corrosion cracking.

Stabilized austenitic stainless steel materials have been developed for the purpose of suppressing sensitization in the HAZ of austenitic stainless steel materials. A stabilized austenitic stainless steel material contains Nb or Ti. The affinity with C is higher in Nb and Ti than in Cr. Therefore, in a stabilized austenitic stainless steel material, Nb carbides and Ti carbides are formed by Nb and Ti, which suppresses formation of Cr carbides. By this means, the formation of Cr depleted zones near grain boundaries is suppressed. As a result, in a stabilized austenitic stainless steel material, sensitization of HAZs can be suppressed.

However, in the case of a stabilized austenitic stainless steel material, there is a possibility that a knife-line attack will occur when welding with higher heat input is performed. The term "knife-line attack" refers to the following phenomenon. When welding with higher heat input is performed, in the stabilized austenitic stainless steel material, the temperature of a portion in the vicinity of the weld metal (a portion corresponding to a HAZ) rises to near the fusing point. Specifically, the temperature of the aforementioned portion in the vicinity of the weld metal rises to around 1200° C. At such time, Nb carbides and Ti carbides which had been fixing C in the steel material dissolve. In the solidification stage (cooling stage) of the weld metal, Nb and Ti attempt to combine with C again. However, the cooling rate of the aforementioned vicinity portion in the solidification stage is high. Consequently, in the solidification stage, in a state in which Nb and Ti have not completely combined with C, the temperature of the vicinity portion drops to 800 to 500° C. which is a temperature range for forming Cr carbides. In this case, Nb and Ti cannot combine with C, and Cr combines with C, whereby Cr carbides are formed. As a result, sharp cracks occur in the portion of the HAZ which is near the boundary with the weld metal. This phenomenon is referred to as a "knife-line attack". A knife-line attack is one type of sensitization. Therefore, it is desired that the occurrence of sensitization can be suppressed even in a case where welding with higher heat input has been performed.

In addition, among the chemical plant facilities mentioned above, in the case of a steel material to be used for an apparatus whose average operation temperature will be 400 to 700° C., it is preferable that sensitization can be also suppressed during the operating period of the apparatus. In previous research, a steel material for use in apparatuses with an average operation temperature of about 400 to 700° C. was held in the temperature region of 550° C. for 1,000 hours, and whether or not sensitization occurred was investigated. However, when taking into consideration the operating period of chemical plants, holding a steel material at 550° C. for 1,000 hours is too short. Therefore, it is preferable that the sensitization of a steel material can be suppressed even after being held at 550° C. for 10,000 hours, which is much longer than at 550° C. for 1,000 hours.

Patent Literature 1 proposes austenitic stainless steel that is excellent in embrittlement cracking resistance in a HAZ in a case where the austenitic stainless steel is used for a long period at a high temperature. The austenitic stainless steel disclosed in Patent Literature 1 contains, in mass %, C: less than 0.04%, Si: 1.5% or less, Mn: 2% or less, Cr: 15 to 25%, Ni: 6 to 30%, N: 0.02 to 0.35%, and sol. Al: 0.03% or less, and further contains one or more types of element selected from Nb: 0.5% or less, Ti: 0.4% or less, V: 0.4% or less, Ta: 0.2% or less, Hf: 0.2% or less, and Zr: 0.2% or less, with the balance being Fe and impurities, in which the respective contents of P, S, Sn, As, Zn, Pb and Sb among the impurities are P: 0.04% or less, S: 0.03% or less, Sn: 0.1% or less, As: 0.01% or less, Zn: 0.01% or less, Pb: 0.01% or less, and Sb: 0.01% or less, and the values of F1 and F2 represented by Formula (1) and Formula (2) below satisfy, respectively, F1≤0.075, and 0.05≤F2≤1.7−9×F1:

$$F1=S+\{(P+Sn)/2\}+\{(As+Zn+Pb+Sb)/5\} \quad \text{Formula (1)}$$

$$F2=Nb+Ta+Zr+Hf+2Ti+(V/10) \quad \text{Formula (2)}.$$

CITATION LIST

Patent Literature

Patent Literature 1: International Application Publication No. WO2009/044802

SUMMARY OF INVENTION

Technical Problem

The austenitic stainless steel proposed in Patent Literature 1 increases the embrittlement cracking resistance of a HAZ in a case where the austenitic stainless steel is used for a long period at a high temperature. However, Patent Literature 1 does not envision the use of welding with higher heat input. Therefore, in Patent Literature 1, sensitization resistance properties after use for a long time period at an average operation temperature of 400 to 700° C. after welding with higher heat input are not investigated.

An objective of the present disclosure is to provide an austenitic stainless steel material having excellent sensitization resistance properties even after for a long time period at an average operation temperature of 400 to 700° C. after welding with higher heat input.

Solution to Problem

An austenitic stainless steel material according to the present disclosure has:
a chemical composition consisting of, in mass %,
C: 0.020% or less,
Si: 1.50% or less,
Mn: 2.00% or less,
P: 0.045% or less,
S: 0.0300% or less,
Cr: 15.00 to 25.00%,
Ni: 9.00 to 20.00%,
N: 0.05 to 0.15%,
Nb: 0.1 to 0.8%,
Mo: 0.10 to 4.50%,
W: 0.01 to 1.00%,
Ti: 0 to 0.50%,
Ta: 0 to 0.50%,
V: 0 to 1.00%,
Zr: 0 to 0.10%,
Hf: 0 to 0.10%,
Cu: 0 to 2.00%,
Co: 0 to 1.00%,
sol. Al: 0 to 0.030%,
B: 0 to 0.0100%,
Ca: 0 to 0.0200%,
Mg: 0 to 0.0200%,
rare earth metal: 0 to 0.100%,
Sn: 0 to 0.010%,
As: 0 to 0.010%,
Zn: 0 to 0.010%,
Pb: 0 to 0.010%, and
Sb: 0 to 0.010%,
with the balance being Fe and impurities,
and satisfying Formula (1),
wherein:
a content of Nb in a residue obtained by an extraction residue method is, in mass %, 0.050 to 0.267%, and a content of Cr in the residue is, in mass %, 0.125% or less;

$$21.9Mo + 5.9W - 5.0 \geq 0 \quad (1)$$

where, a content (mass %) of a corresponding element in the chemical composition is substituted for each symbol of an element in Formula (1).

Advantageous Effect of Invention

The austenitic stainless steel material of the present disclosure has excellent sensitization resistance properties, even after use for a long time period at an average operation temperature of 400 to 700° C. after welding with higher heat input.

DESCRIPTION OF EMBODIMENTS

Figure 1:
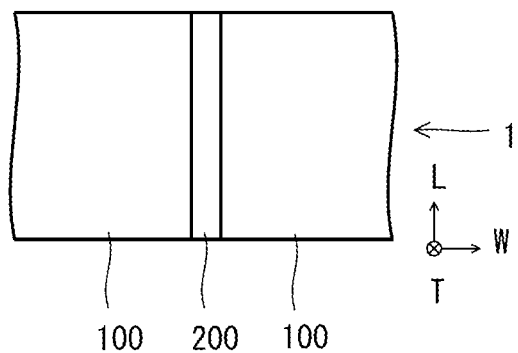
FIG. 1 is a plan view illustrating one example of a welded joint of the present embodiment.

The present inventors conducted studies regarding an austenitic stainless steel material having excellent sensitization resistance properties even after use for a long time period at an average operation temperature of 400 to 700° C. after welding with higher heat input.

The present inventors initially conducted studies regarding the chemical composition of the steel material. In order to improve sensitization resistance properties, it is effective to suppress formation of Cr depleted zones at grain boundaries. In order to suppress formation of Cr depleted zones at grain boundaries, it is effective to suppress formation of Cr carbides in the steel material. In order to suppress formation of Cr carbides, it is effective to reduce the content of C in the chemical composition of the steel material. In addition, in order to inhibit C in the steel material from combining with Cr, it is effective to contain Nb in the steel material so as to cause C in the steel material to combine with Nb. Therefore, the present inventors initially conducted studies regarding the chemical composition of the steel material for the purpose of enhancing the sensitization resistance properties of the steel material. As a result, the present inventors considered that if an austenitic stainless steel material has a chemical composition consisting of C: 0.020% or less, Si: 1.50% or less, Mn: 2.00% or less, P: 0.045% or less, S: 0.0300% or less, Cr: 15.00 to 25.00%, Ni: 9.00 to 20.00%, N: 0.05 to 0.15%, Nb: 0.1 to 0.8%, Ti: 0 to 0.50%, Ta: 0 to 0.50%, V: 0 to 1.00%, Zr: 0 to 0.10%, Hf: 0 to 0.10%, Cu: 0 to 2.00%, Co: 0 to 1.00%, sol. Al: 0 to 0.030%, B: 0 to 0.0100%, Ca: 0 to 0.0200%, Mg: 0 to 0.0200%, rare earth metal: 0 to 0.100%, Sn: 0 to 0.010%, As: 0 to 0.010%, Zn: 0 to 0.010%, Pb: 0 to 0.010%, and Sb: 0 to 0.010%, with the balance being Fe and impurities, formation of Cr carbides can be suppressed.

In this connection, as mentioned above, when newly constructing or repairing a petrochemical plant, there are cases where welding with higher heat input is performed on an austenitic stainless steel material. When welding with higher heat input is performed, the temperature of a portion of the steel material that is in the vicinity of the weld metal (the portion corresponding to a HAZ) is more than 1200° C. due to the welding heat during the welding with higher heat input. Consequently, even if the amount of Cr carbides present in the steel material is not so large before the welding with higher heat input, Cr carbides may be formed in the steel material after the welding with higher heat input. In this case, there is a possibility that sensitization will occur in the austenitic stainless steel material if the relevant equipment at the petrochemical plant is operated and held for a long time period at an average operation temperature of 400 to 700° C.

Therefore, the present inventors also conducted investigations regarding means that can suppress the occurrence of sensitization even in a case where the austenitic stainless steel material is held for a long time period at an average operation temperature of 400 to 700° C. after being subjected to welding with higher heat input. As a result, the present inventors obtained the following findings.

In the chemical composition of the austenitic stainless steel material mentioned above, Mo: 0.10 to 4.50% and W: 0.01 to 1.00% are contained as essential elements in lieu of one part of Fe. The Cr carbides that form in the steel material during the steel material production process and during welding with higher heat input are $M_{23}C_6$-type carbides. Mo and W enter the Cr site (M site) of the $M_{23}C_6$-type carbides by replacing Cr, and lower the free energy of the Cr carbides. In addition, the diffusion velocity of Mo and the diffusion velocity of W are slower than the diffusion velocity of Cr. Therefore, the growth rate of Cr carbides in which Mo and/or W entered the M site in place of Cr becomes significantly slower. The present inventors considered that, because of the above mechanism, by containing Mo and W, the formation and growth of Cr carbides during production of the steel material and during welding with higher heat input are suppressed.

However, the results of studies conducted by the present inventors showed that even when the steel material contained the aforementioned contents of Mo and W, when the steel material is held for a long time period at an average operation temperature of 400 to 700° C. after welding with higher heat input, in some cases sensitization cannot be adequately suppressed. Therefore the present inventors conducted further studies. As a result, the present inventors found that if the content (mass %) of Mo and the content (mass %) of W in the steel material satisfy Formula (1), even when the steel material is held for a long time period at an average operation temperature of 400 to 700° C. after welding with higher heat input, the sensitization resistance properties improve.

$$21.9Mo+5.9W-5.0\geq 0 \tag{1}$$

Where, a content (mass %) of a corresponding element in the chemical composition is substituted for each symbol of an element in Formula (1).

The present inventors also conducted investigations regarding means that can further enhance sensitization resistance properties in an austenitic stainless steel material in which the content of each element in the chemical composition is within the aforementioned range and which satisfies Formula (1), even when the austenitic stainless steel material is held for a long time period at an average operation temperature of 400 to 700° C. after welding with higher heat input.

Here, the present inventors focused attention on the precipitates in the steel material. The present inventors increased the proportion occupied by Cr—Nb nitrides among the precipitates in the austenitic stainless steel material having the aforementioned chemical composition. Specifically, present inventors increased the proportion of Cr—Nb nitrides among the precipitates. Cr—Nb nitrides are fine precipitates (nitrides) containing Cr and Nb. Cr—Nb nitrides increase the grain boundary area of the steel material. When the grain boundary area increases, the sensitization resistance properties improve even in a case where, after welding with higher heat input has been performed, the austenitic stainless steel material is held for a long time period at an average operation temperature of 400 to 700° C.

Cr—Nb nitrides are extremely fine. Therefore, quantitatively measuring the number density of Cr—Nb nitrides with a scanning electron microscope or the like is difficult with the measurement techniques available at the current time. However, if a steel material is subjected to an extraction residue method, and the chemical composition of the residue obtained by the extraction residue method is determined, the precipitates in the steel material can be estimated. As a result of the studies conducted by the present inventors, it has been found that, with respect to a residue obtained by performing an extraction residue method on an austenitic stainless steel material in which the content of each element in the chemical composition is within the aforementioned range and which satisfies Formula (1), if the content of Nb in the residue is, in mass %, 0.050 to 0.267%, and the content of Cr in the residue is, in mass %, 0.125% or less, the proportion that Cr—Nb nitrides occupy among the precipitates in the steel material will be sufficiently high. As a result, it has been found that excellent sensitization resistance properties are obtained even in a case where the steel material is held for a long time period at an average operation temperature of 400 to 700° C. after performing welding with higher heat input.

The austenitic stainless steel material of the present embodiment that has been completed based on the above findings is as follows.

[1]

An austenitic stainless steel material, having:
a chemical composition consisting of, in mass %,
C: 0.020% or less,
Si: 1.50% or less,
Mn: 2.00% or less,
P: 0.045% or less,
S: 0.0300% or less,
Cr: 15.00 to 25.00%,
Ni: 9.00 to 20.00%,
N: 0.05 to 0.15%,
Nb: 0.1 to 0.8%,
Mo: 0.10 to 4.50%,
W: 0.01 to 1.00%,
Ti: 0 to 0.50%,
Ta: 0 to 0.50%,
V: 0 to 1.00%,
Zr: 0 to 0.10%,
Hf: 0 to 0.10%,
Cu: 0 to 2.00%,
Co: 0 to 1.00%,
sol. Al: 0 to 0.030%,
B: 0 to 0.0100%,
Ca: 0 to 0.0200%, Mg: 0 to 0.0200%,
rare earth metal: 0 to 0.100%,
Sn: 0 to 0.010%,
As: 0 to 0.010%,
Zn: 0 to 0.010%,
Pb: 0 to 0.010%, and
Sb: 0 to 0.010%,
with the balance being Fe and impurities, and
satisfying Formula (1),
wherein:
a content of Nb in a residue obtained by an extraction residue method is, in mass %, 0.050 to 0.267%, and a content of Cr in the residue is, in mass %, 0.125% or less;

$$21.9Mo+5.9W-5.0\geq0 \tag{1}$$

where, a content (mass %) of a corresponding element in the chemical composition is substituted for each symbol of an element in Formula (1).

Here, the term "content of Nb in a residue" means the proportion (mass %) of the mass of the content of Nb in the residue with respect to the mass of the austenitic stainless steel material (mass of austenitic stainless steel material mainly electrolyzed by the extraction residue method). The term "content of Cr in the residue" means the proportion (mass %) of the mass of the content of Cr in the residue with respect to the mass of the austenitic stainless steel material (mass of austenitic stainless steel material mainly electrolyzed by the extraction residue method).

The austenitic stainless steel material of the present embodiment described above has excellent sensitization resistance properties even after use for a long time period at an average operation temperature of 400 to 700° C. after welding with higher heat input.

[2]

The austenitic stainless steel material according to [1], wherein
the chemical composition contains:
Mo: 2.50 to 4.50%, and
Co: 0.01 to 1.00%,
and further satisfies Formula (2) and Formula (3), and
a content of Nb in the residue obtained by the extraction residue method is, in mass %, 0.065 to 0.245%, and a content of Cr in the residue is, in mass %, 0.104% or less;

$$2\leq73W+5Co\leq60 \tag{2}$$

$$0.20\leq Nb+0.1W\leq0.58 \tag{3}$$

The austenitic stainless steel material according to the above [2] further has excellent polythionic acid SCC resistance, excellent liquation cracking resistance, and excellent naphthenic acid corrosion resistance.

[3]

The austenitic stainless steel material according to [1] or [2], wherein the chemical composition contains at least one or more elements belonging to any group among a first group to a fifth group:
first group:
Ti: 0.01 to 0.50%,
Ta: 0.01 to 0.50%,
V: 0.01 to 1.00%,
Zr: 0.01 to 0.10%, and
Hf: 0.01 to 0.10%;
second group:
Cu: 0.01 to 2.00%, and
Co: 0.01 to 1.00%;
third group:
sol. Al: 0.001 to 0.030%;
fourth group:
B: 0.0001 to 0.0100%;
fifth group:
Ca: 0.0001 to 0.0200%,
Mg: 0.0001 to 0.0200%, and
rare earth metal: 0.001 to 0.100%.

[4]

A welded joint, including:
a pair of the austenitic stainless steel materials according to [2] or [3], and a weld metal arranged between the pair of the austenitic stainless steel materials,
wherein,
when, in a cross section of the austenitic stainless steel material that is perpendicular to an extending direction of the weld metal, an average grain size in a range of 200 μm in a width direction of the weld metal from a fusion line that is inside a heat affected zone is defined as an "average grain size R1", and an average grain size of a portion other than the heat affected zone is defined as an "average grain size R2",
the average grain size R1 and the average grain size R2 satisfy Formula (4):

$$R1/R2\leq4.8 \tag{4}$$

Hereunder, the austenitic stainless steel material and the welded joint of the present embodiment are described in detail. The symbol "%" in relation to an element means "mass %" unless specifically stated otherwise.

Regarding Chemical Composition

The chemical composition of the austenitic stainless steel material of the present embodiment contains the following elements.

C: 0.020% or Less

Carbon (C) is unavoidably contained. In other words, the content of C is more than 0%. C forms $M_{23}C_6$-type carbides at grain boundaries. If the content of C is more than 0.020%, even if the contents of other elements are within the range of the present embodiment, Cr carbides will excessively form and the sensitization resistance properties of the steel material will markedly decrease. Therefore, the content of C is 0.020% or less. A preferable upper limit of the content of C is 0.018%, more preferably is 0.016%, further preferably is 0.014%, and further preferably is 0.012%. The content of C is preferably as low as possible. However, if the content of C is excessively reduced, the production cost will increase. Therefore, for industrial production, a preferable lower limit of the content of C is 0.001%, and further preferably is 0.002%.

Si: 1.50% or Less

Silicone (Si) is unavoidably contained. In other words, the content of Si is more than 0%. Si deoxidizes the steel in the steel making process. If even a small amount of Si is contained, the aforementioned effect is obtained to a certain extent. However, if the content of Si is more than 1.50%, even if the contents of other elements are within the range of the present embodiment, weld cracking susceptibility will markedly increase. In addition, because Si is a ferrite stabilizing element, the stability of the austenite will decrease. In such a case, sigma phase (a phase) will form in the steel material during use for a long time period at an average operation temperature of 400 to 700° C. The a phase will reduce the toughness and ductility of the steel material during use at an average operation temperature of 400 to 700° C. Therefore, the content of Si is 1.50% or less. A preferable lower limit of the content of Si is 0.01%, more preferably is 0.05%, further preferably is 0.10%, further preferably is 0.15%, and further preferably is 0.20%. A preferable upper limit of the content of Si is 1.40%, more preferably is 1.20%, further preferably is 1.00%, further preferably is 0.80%, further preferably is 0.70%, further preferably is 0.60%, and further preferably is 0.50%.

Mn: 2.00% or Less

Manganese (Mn) is unavoidably contained. In other words, the content of Mn is more than 0%. Mn combines with S in the steel material to form MnS, and thereby increases the hot workability of the steel material. Mn also deoxidizes the weld zone of the steel material during welding. If even a small amount of Mn is contained, the aforementioned effects are obtained to a certain extent. However, if the content of Mn is more than 2.00%, even if the contents of other elements are within the range of the present embodiment, sigma phase (a phase) will easily form in the steel material during use at an average operation temperature of 400 to 700° C. The a phase will reduce the toughness and ductility of the steel material during use at an average operation temperature of 400 to 700° C. Therefore, the content of Mn is 2.00% or less. A preferable lower limit of the content of Mn is 0.01%, more preferably is 0.10%, further preferably is 0.50%, further preferably is 1.00%, further preferably is 1.20%, and further preferably is 1.30%. A preferable upper limit of the content of Mn is 1.80%, more preferably is 1.60%, and further preferably is 1.55%.

P: 0.045% or Less

Phosphorus (P) is an impurity that is unavoidably contained. In other words, the content of P is more than 0%. During welding with higher heat input, P segregates at grain boundaries of the steel material. As a result, the sensitization resistance properties of the steel material decrease. In addition, P increases the weld cracking susceptibility of the steel material during welding. If the content of P is more than 0.045%, even if the contents of other elements are within the range of the present embodiment, the sensitization resistance properties of the steel material will decrease and the weld cracking susceptibility will increase. Therefore, the content of P is 0.045% or less. A preferable upper limit of the content of P is 0.040%, more preferably is 0.035%, and further preferably is 0.030%. The content of P is preferably as low as possible. However, excessively reducing the content of P will raise the production cost of the steel material. Therefore, when taking into consideration normal industrial production, a preferable lower limit of the content of P is 0.001%, and more preferably is 0.002%.

S: 0.0300% or Less

Sulfur (S) is an impurity that is unavoidably contained. In other words, the content of S is more than 0%. S segregates at grain boundaries during use of the steel material under a high temperature environment. As a result, the sensitization resistance properties of the steel material decrease. In addition, S increases the weld cracking susceptibility of the steel material during welding. If the content of S is more than 0.0300%, even if the contents of other elements are within the range of the present embodiment, the sensitization resistance properties of the steel material will decrease and the weld cracking susceptibility will increase. Therefore, the content of S is 0.0300% or less. A preferable upper limit of the content of S is 0.0200%, more preferably is 0.0150%, further preferably is 0.0100%, further preferably is 0.0060%, further preferably is 0.0050%, further preferably is 0.0040%, and further preferably is 0.0030%. The content of S is preferably as low as possible. However, excessively reducing the content of S will raise the production cost of the steel material. Therefore, when taking into consideration normal industrial production, a preferable lower limit of the content of S is 0.0001%, and more preferably is 0.0002%.

Cr: 15.00 to 25.00%

Chromium (Cr) increases the oxidation resistance and corrosion resistance of the steel material during use of the steel material at an average operation temperature of 400 to 700° C. If the content of Cr is less than 15.00%, even if the contents of other elements are within the range of the present embodiment, the aforementioned effect will not be sufficiently obtained. On the other hand, if the content of Cr is more than 25.00%, even if the contents of other elements are within the range of the present embodiment, the stability of austenite in the steel material at an average operation temperature of 400 to 700° C. will decrease. In this case, the creep strength of the steel material will decrease. Therefore, the content of Cr is 15.00 to 25.00%. A preferable lower limit of the content of Cr is 15.50%, more preferably is 16.00%, further preferably is 16.20%, and further preferably is 16.40%. A preferable upper limit of the content of Cr is 24.00%, more preferably is 23.00%, further preferably is 22.00%, further preferably is 21.00%, further preferably is 20.00%, and further preferably is 19.00%.

Ni: 9.00 to 20.00%

Nickel (Ni) stabilizes austenite and increases the creep strength of the steel material at an average operation temperature of 400 to 700° C. If the content of Ni is less than 9.00%, even if the contents of other elements are within the range of the present embodiment, the aforementioned effect will not be sufficiently obtained. On the other hand, if the content of Ni is more than 20.00%, the aforementioned effect will be saturated and, furthermore, the production cost will increase. Therefore, the content of Ni is 9.00 to 20.00%. A preferable lower limit of the content of Ni is 9.50%, more preferably is 9.80%, and further preferably is 10.00%. A preferable upper limit of the content of Ni is 18.00%, more preferably is 16.00%, further preferably is 15.00%, further preferably is 14.50%, further preferably is 14.00%, and further preferably is 13.50%.

N: 0.05 to 0.15%

Nitrogen (N) dissolves in the matrix (parent phase) and stabilizes austenite. N also forms Cr—Nb nitrides in the steel material. The Cr—Nb nitrides increase the total area of grain boundaries. Therefore, formation of Cr carbides can be suppressed even in a case where operation is performed for a long time period at an average operation temperature of 400 to 700° C. As a result, the sensitization resistance properties of the steel material improve. If the content of N is less than 0.05%, the aforementioned effects will not be sufficiently obtained. On the other hand, if the content of N is more than 0.15%, Cr nitrides ($Cr_2N$) will form at grain boundaries. In such a case, the amount of dissolved Cr in the steel material will decrease, and as a result, the sensitization resistance properties of the steel material will decrease. Therefore, the content of N is 0.05 to 0.15%. A preferable lower limit of the content of N is 0.06%, and more preferably is 0.07%. A preferable upper limit of the content of N is 0.14%, more preferably is 0.12%, further preferably is 0.10%, and further preferably is 0.09%.

Nb: 0.1 to 0.8%

Niobium (Nb), together with N, forms Cr—Nb nitrides in austenite grains, and increases the total area of the grain boundaries. Therefore, formation of Cr carbides can be suppressed even in a case where operation is performed for a long time period at an average operation temperature of 400 to 700° C. As a result, the sensitization resistance properties of the steel material improve. Nb also combines with C to form MX-type Nb carbides. When Nb carbides form and fix C, the amount of dissolved C in the steel material decreases. By this means, during use of the steel material at an average operation temperature of 400 to 700° C., formation of Cr carbides at grain boundaries is suppressed and the sensitization resistance properties of the steel material improve. Nb carbides also improve the creep strength of the steel material at an average operation temperature of 400 to 700° C. by precipitation strengthening. If the content of Nb is less than 0.1%, even if the contents of other elements are within the range of the present embodiment, the aforementioned effects will not be sufficiently obtained. On the other hand, if the content of Nb is more than 0.8%, even if the contents of other elements are within the range of the present embodiment, Cr—Nb nitrides and Nb carbides will excessively form. In this case, the strength within the grains will become excessively high, and a strength difference between the inside of the grains and the grain boundaries will be large. Consequently, stress concentration will occur at grain boundary interfaces, and weld cracks or embrittlement cracks will be likely to occur. Therefore, the content of Nb is 0.1 to 0.8%. A preferable lower limit of the content of Nb is 0.2%, and more preferably is 0.3%. A preferable upper limit of the content of Nb is 0.7%, more preferably is 0.6%, further preferably is 0.5%, and further preferably is 0.4%.

Mo: 0.10 to 4.50%

Molybdenum (Mo) suppresses formation and growth of $M_{23}C_6$-type carbides at grain boundaries during use of the steel material at an average operation temperature of 400 to 700° C. In addition, as a solid-solution strengthening element, Mo increases the creep strength of the steel material at an average operation temperature of 400 to 700° C. If the content of Mo is less than 0.10%, even if the contents of other elements are within the range of the present embodiment, the aforementioned effects will not be sufficiently obtained. On the other hand, if the content of Mo is more than 4.50%, even if the contents of other elements are within the range of the present embodiment, formation of intermetallic compounds such as Laves phases within grains will be promoted. In such a case, the strength within the grains will be excessively high, and the strength difference between the inside of the grains and the grain boundaries will be large. Consequently, stress concentration will occur at grain boundary interfaces, and weld cracks or embrittlement cracks will be likely to occur. Therefore, the content of Mo is 0.10 to 4.50%.

Note that, in the chemical composition of the steel material, when the contents of the elements other than Mo are within the range of the present embodiment, if the content of Mo is 2.50% or more, in addition, the polythionic acid SCC resistance and the naphthenic acid corrosion resistance can be increased in the steel material that is used at an average operation temperature of 400 to 700° C. Therefore, in a case where sufficient polythionic acid SCC resistance and sufficient naphthenic acid corrosion resistance are required in the steel material that is used at an average operation temperature of 400 to 700° C., the content of Mo is 2.50 to 4.50%.

In the case of using the austenitic stainless steel material for an application in which polythionic acid SCC resistance and naphthenic acid corrosion resistance are not particularly required, a preferable lower limit of the content of Mo is 0.15%, more preferably is 0.20%, further preferably is 0.25%, further preferably is 0.27%, and further preferably is 0.30%.

In the case of using the austenitic stainless steel material for an application in which polythionic acid SCC resistance and naphthenic acid corrosion resistance are not particularly required, a preferable upper limit of the content of Mo is less than 2.50%, more preferably is 2.45%, further preferably is 2.20%, further preferably is 2.00%, further preferably is 1.70%, further preferably is 1.50%, further preferably is 1.30%, further preferably is 1.00%, further preferably is 0.90%, further preferably is 0.80%, further preferably is 0.70%, further preferably is 0.60%, and further preferably is 0.50%.

In the case of using the austenitic stainless steel material for an application in which polythionic acid SCC resistance and naphthenic acid corrosion resistance are required, a preferable lower limit of the content of Mo is, as mentioned above, 2.50%, and more preferably is 2.70%, further preferably is 2.90%, further preferably is 3.00%, further preferably is 3.05%, and further preferably is 3.10%. In the case of using the austenitic stainless steel material for an application in which polythionic acid SCC resistance and naphthenic acid corrosion resistance are required, a preferable upper limit of the content of Mo is 4.30%, further preferably is 4.20%, further preferably is 4.15%, further preferably is 4.05%, and further preferably is 3.95%.

W: 0.01 to 1.00%

Tungsten (W) suppresses formation and growth of $M_{23}C_6$-type carbides at grain boundaries during use of the steel material at an average operation temperature of 400 to 700° C., similarly to Mo. In addition, as a solid-solution strengthening element, W increases the creep strength of the steel material at an average operation temperature of 400 to 700° C. If the content of W is less than 0.01%, even if the contents of other elements are within the range of the present embodiment, the aforementioned effects will not be sufficiently obtained. On the other hand, if the content of W is more than 1.00%, even if the contents of other elements are within the range of the present embodiment, formation of intermetallic compounds such as Laves phases within grains will be promoted. In such a case, the strength within the grains will be excessively high, and the strength difference between the inside of the grains and the grain boundaries will be large. Consequently, stress concentration will occur at grain boundary interfaces, and weld cracks or embrittlement cracks will be likely to occur. Therefore, the content of W is 0.01 to 1.00%. A preferable lower limit of the content of W is 0.02%, more preferably is 0.04%, further preferably is 0.06%, further preferably is 0.08%, and further preferably is 0.10%. A preferable upper limit of the content of W is 0.80%, further preferably is 0.60%, further preferably is 0.40%, further preferably is 0.35%, and further preferably is 0.30%.

The balance in the chemical composition of the austenitic stainless steel material according to the present embodiment is Fe and impurities. Here, the term "impurities" refers to elements which, during industrial production of the austenitic stainless steel material, are mixed in from ore or scrap that is used as a raw material, or from the production environment or the like, and which are allowed within a range that does not adversely affect the austenitic stainless steel material of the present embodiment.

Among the impurities, the respective contents of Sn, As, Zn, Pb and Sb are as follows.

Sn: 0 to 0.010%
As: 0 to 0.010%
Zn: 0 to 0.010%
Pb: 0 to 0.010%
Sb: 0 to 0.010%

Tin (Sn), arsenic (As), zinc (Zn), lead (Pb) and antimony (Sb) are each an impurity. The content of Sn may be 0%. Similarly, the content of As may be 0%. The content of Zn may be 0%. The content of Pb may be 0%. The content of Sb may be 0%. If contained, each of these elements segregates at grain boundaries and lowers the fusing point of the grain boundaries, and reduces the bonding strength of the grain boundaries. If the content of Sn is more than 0.010%, even if the contents of other elements are within the range of the present embodiment, the hot workability and weldability of the steel material will decrease. Similarly, if the content of As is more than 0.010%, even if the contents of other elements are within the range of the present embodiment, the hot workability and weldability of the steel material will decrease. If the content of Zn is more than 0.010%, even if the contents of other elements are within the range of the present embodiment, the hot workability and weldability of the steel material will decrease. If the content of Pb is more than 0.010%, even if the contents of other elements are within the range of the present embodiment, the hot workability and weldability of the steel material will decrease. If the content of Sb is more than 0.010%, even if the contents of other elements are within the range of the present embodiment, the hot workability and weldability of the steel material will decrease. Therefore, the content of Sn is 0 to 0.010%. The content of As is 0 to 0.010%. The content of Zn is 0 to 0.010%. The content of Pb is 0 to 0.010%. The content of Sb is 0 to 0.010%. The lower limit of the content of Sn may be more than 0%, and may be 0.001%. The lower limit of the content of As may be more than 0%, and may be 0.001%. The lower limit of the content of Zn may be more than 0%, and may be 0.001%. The lower limit of the content of Pb may be more than 0%, and may be 0.001%. The lower limit of the content of Sb may be more than 0%, and may be 0.001%.

Regarding Optional Elements

First Group of Optional Elements

The chemical composition of the austenitic stainless steel material according to the present embodiment may also contain one or more elements selected from the group consisting of Ti, Ta, V, Zr and Hf in lieu of a part of Fe. Each of these elements combines with C to form a carbide. Therefore, each of these elements reduces dissolved C, and the sensitization resistance properties of the steel material improve.

Ti: 0 to 0.50%

Titanium (Ti) is an optional element, and need not be contained. In other words, the content of Ti may be 0%. When contained, Ti combines with C in the steel material to form carbides. By this means, the formation of Cr carbides is suppressed, and the sensitization resistance properties of the steel material improve. If even a small amount of Ti is contained, the aforementioned effect is obtained to a certain extent. However, if the content of Ti is more than 0.50%, even if the contents of other elements are within the range of the present embodiment, carbides will excessively precipitate in the grains. In such a case, the strength within the grains will become excessively high, and the strength difference between the inside of the grains and the grain boundaries will be large. Consequently, stress concentration will occur at grain boundary interfaces, and weld cracks or embrittlement cracks will be likely to occur. Therefore, the content of Ti is 0 to 0.50%. A preferable lower limit of the content of Ti is more than 0%, more preferably is 0.01%, and further preferably is 0.02%. A preferable upper limit of the content of Ti is 0.45%, more preferably is 0.40%, further preferably is 0.35%, and further preferably is 0.30%.

Ta: 0 to 0.50%

Tantalum (Ta) is an optional element, and need not be contained. In other words, the content of Ta may be 0%. When contained, Ta combines with C to form carbides. By this means, the formation of Cr carbides is suppressed, and the sensitization resistance properties of the steel material improve. If even a small amount of Ta is contained, the aforementioned effect is obtained to a certain extent. However, if the content of Ta is more than 0.50%, even if the contents of other elements are within the range of the present embodiment, carbides will excessively precipitate in the grains. In such a case, the strength within the grains will become excessively high, and the strength difference between the inside of the grains and the grain boundaries will be large. Consequently, stress concentration will occur at grain boundary interfaces, and weld cracks or embrittlement cracks will be likely to occur. Therefore, the content of Ta is 0 to 0.50%. A preferable lower limit of the content of Ta is more than 0%, more preferably is 0.01%, and further preferably is 0.02%. A preferable upper limit of the content of Ta is 0.45%, more preferably is 0.40%, further preferably is 0.35%, and further preferably is 0.30%.

V: 0 to 1.00%

Vanadium (V) is an optional element, and need not be contained. In other words, the content of V may be 0%. When contained, V combines with C to form carbides. By this means, the formation of Cr carbides is suppressed, and the sensitization resistance properties of the steel material improve. If even a small amount of V is contained, the aforementioned effect is obtained to a certain extent. However, if the content of V is more than 1.00%, even if the contents of other elements are within the range of the present embodiment, carbides will excessively precipitate in the grains. In such a case, the strength within the grains will become excessively high, and the strength difference between the inside of the grains and the grain boundaries will be large. Consequently, stress concentration will occur at grain boundary interfaces, and weld cracks or embrittlement cracks will be likely to occur. Therefore, the content of V is 0 to 1.00%. A preferable lower limit of the content of V is more than 0%, more preferably is 0.01%, further preferably is 0.02%, further preferably is 0.04%, and further preferably is 0.06%. A preferable upper limit of the content of V is 0.80%, further preferably is 0.70%, further preferably is 0.50%, further preferably is 0.40%, further preferably is 0.35%, and further preferably is 0.30%.

Zr: 0 to 0.10%

Zirconium (Zr) is an optional element, and need not be contained. In other words, the content of Zr may be 0%. When contained, Zr combines with C to form carbides. By this means, the formation of Cr carbides is suppressed, and the sensitization resistance properties of the steel material improve. If even a small amount of Zr is contained, the aforementioned effect is obtained to a certain extent. However, if the content of Zr is more than 0.10%, even if the contents of other elements are within the range of the present embodiment, carbides will excessively precipitate in the grains. In such a case, the strength within the grains will become excessively high, and the strength difference between the inside of the grains and the grain boundaries will be large. Consequently, stress concentration will occur at grain boundary interfaces, and weld cracks or embrittlement cracks will be likely to occur. Therefore, the content of Zr is 0 to 0.10%. A preferable lower limit of the content of Zr is more than 0%, more preferably is 0.01%, and further preferably is 0.02%. A preferable upper limit of the content of Zr is 0.09%, more preferably is 0.08%, further preferably is 0.07%, and further preferably is 0.06%.

Hf: 0 to 0.10%

Hafnium (Hf) is an Optional Element, and Need not be Contained. In Other words, the content of Hf may be 0%. When contained, Hf combines with C to form carbides. By this means, the formation of Cr carbides is suppressed, and the sensitization resistance properties of the steel material improve. If even a small amount of Hf is contained, the aforementioned effect is obtained to a certain extent. However, if the content of Hf is more than 0.10%, even if the contents of other elements are within the range of the present embodiment, carbides will excessively precipitate in the grains. In such a case, the strength within the grains will become excessively high, and the strength difference between the inside of the grains and the grain boundaries will be large. Consequently, stress concentration will occur at grain boundary interfaces, and weld cracks or embrittlement cracks will be likely to occur. Therefore, the content of Hf is 0 to 0.10%. A preferable lower limit of the content of Hf is more than 0%, more preferably is 0.01%, and further preferably is 0.02%. A preferable upper limit of the content of Hf is 0.09%, more preferably is 0.08%, further preferably is 0.07%, and further preferably is 0.06%.

Second Group of Optional Elements

The chemical composition of the austenitic stainless steel material according to the present embodiment may also contain one or more elements selected from the group consisting of Cu and Co in lieu of a part of Fe. Each of these elements increases the creep strength of the steel material at an average operation temperature of 400 to 700° C.

Cu: 0 to 2.00%

Copper (Cu) is an optional element, and need not be contained. In other words, the content of Cu may be 0%. When contained, during use of the steel material at an average operation temperature of 400 to 700° C., Cu precipitates as a Cu phase in the grains, and increases the creep strength of the steel material by precipitation strengthening. If even a small amount of Cu is contained, the aforementioned effect is obtained to a certain extent. However, if the content of Cu is more than 2.00%, even if the contents of other elements are within the range of the present embodiment, a Cu phase will excessively precipitate. In such a case, the susceptibility to embrittlement cracking in the HAZ after welding increases. Therefore, the content of Cu is 0 to 2.00%. A preferable lower limit of the content of Cu is more than 0%, more preferably is 0.01%, further preferably is 0.03%, further preferably is 0.05%, and further preferably is 0.10%. A preferable upper limit of the content of Cu is 1.50%, more preferably is 1.00%, further preferably is 0.80%, and further preferably is 0.60%.

Co: 0 to 1.00%

Cobalt (Co) is an optional element, and need not be contained. In other words, the content of Co may be 0%. When contained, Co stabilizes austenite and increases the creep strength of the steel material at an average operation temperature of 400 to 700° C. Similarly to W, Co also increases the polythionic acid SCC resistance of the steel material. If even a small amount of Co is contained, the aforementioned effects are obtained to a certain extent. However, if the content of Co is more than 1.00%, even if the contents of other elements are within the range of the present embodiment, the raw material cost will increase. Therefore, the content of Co is 0 to 1.00%. A preferable lower limit of the content of Co is more than 0%, more preferably is 0.01%, further preferably is 0.05%, further preferably is 0.10%, and further preferably is 0.20%. A preferable upper limit of the content of Co is 0.90%, more preferably is 0.80%, further preferably is 0.70%, and further preferably is 0.60%.

Third Group of Optional Elements

The chemical composition of the austenitic stainless steel material according to the present embodiment may, in addition, contain Al in lieu of a part of Fe. Al deoxidizes the steel in the steel making process.

Sol. Al: 0 to 0.030%

Aluminum (Al) is an optional element, and need not be contained. In other words, the content of Al may be 0%. When contained, Al deoxidizes the steel in the steel making process. If even a small amount of Al is contained, the aforementioned effect is obtained to a certain extent. However, if the content of sol. Al is more than 0.030%, even if the contents of other elements are within the range of the present embodiment, the workability and ductility of the steel material will decrease. Therefore, the content of sol. Al is 0 to 0.030%. A preferable lower limit of the content of sol. Al is more than 0%, more preferably is 0.001%, further preferably is 0.005%, and further preferably is 0.010%. A preferable upper limit of the content of sol. Al is 0.029%, further preferably is 0.028%, and further preferably is 0.025%. In the present embodiment, the content of sol. Al means the content of soluble Al (sol. Al).

Fourth Group of Optional Elements

The chemical composition of the austenitic stainless steel material according to the present embodiment may, in addition, contain B in lieu of a part of Fe. B segregates at grain boundaries and thereby strengthens the grain boundaries.

B: 0 to 0.0100%

Boron (B) is an optional element, and need not be contained. In other words, the content of B may be 0%. When contained, during use of the steel material at an average operation temperature of 400 to 700° C., B segregates at grain boundaries to thereby increase the grain boundary strength. If even a small amount of B is contained, the aforementioned effect is obtained to a certain extent. However, if the content of B is more than 0.0100%, even if the contents of other elements are within the range of the present embodiment, formation of Cr carbides at the grain boundaries will be promoted. Consequently, the sensitization resistance properties of the steel material will decrease. In addition, if the content of B is more than 0.0100%, the fusing point of the grain boundaries will decrease, and liquation cracking will occur at grain boundaries of the HAZ during welding. Therefore, the content of B is 0 to 0.0100%. A preferable lower limit of the content of B is more than 0%, more preferably is 0.0001%, further preferably is 0.0005%, and further preferably is 0.0010%. A preferable upper limit of the content of B is 0.0050%, more preferably is 0.0040%/o, further preferably is 0.0030%, and further preferably is 0.0020%.

Fifth Group of Optional Elements

The chemical composition of the austenitic stainless steel material according to the present embodiment may also contain one or more elements selected from the group consisting of Ca, Mg and rare earth metal (REM) in lieu of a part of Fe. Each of these elements increases the hot workability of the steel material.

Ca: 0 to 0.0200%

Calcium (Ca) is an optional element, and need not be contained. In other words, the content of Ca may be 0%. When contained, Ca fixes O (oxygen) and S (sulfur) as inclusions, and thereby increases the hot workability of the steel material. Ca also fixes S, and thereby suppresses grain-boundary segregation of S. By this means, embrittlement cracks in the HAZ during welding are reduced. If even a small amount of Ca is contained, the aforementioned effects are obtained to a certain extent. However, if the content of Ca is more than 0.0200%, the cleanliness of the steel material decreases, and the hot workability of the steel material, on the contrary, decreases. Therefore, the content of Ca is 0 to 0.0200%. A preferable lower limit of the content of Ca is more than 0%, more preferably is 0.0001%, further preferably is 0.0002%, and further preferably is 0.0005%. A preferable upper limit of the content of Ca is 0.0150%, more preferably is 0.0100%, further preferably is 0.0080%, further preferably is 0.0050%, and further preferably is 0.0040%.

Mg: 0 to 0.0200%

Magnesium (Mg) is an optional element, and need not be contained. In other words, the content of Mg may be 0%. When contained, Mg fixes O (oxygen) and S (sulfur) as inclusions, and thereby increases the hot workability of the steel material. Mg also fixes S, and thereby suppresses grain-boundary segregation of S. By this means, embrittlement cracks in the HAZ during welding are reduced. If even a small amount of Mg is contained, the aforementioned effects are obtained to a certain extent. However, if the content of Mg is more than 0.0200%, the cleanliness of the steel material decreases, and the hot workability of the steel material, on the contrary, decreases. Therefore, the content of Mg is 0 to 0.0200%. A preferable lower limit of the content of Mg is more than 0%, more preferably is 0.0001%, further preferably is 0.0002%, and further preferably is 0.0005%. A preferable upper limit of the content of Mg is 0.0150%, more preferably is 0.0100%, further preferably is 0.0080%, further preferably is 0.0050%, and further preferably is 0.0040%.

Rare Earth Metal: 0 to 0.100%

Rare earth metal (REM) is an optional element, and need not be contained. In other words, the content of REM may be 0%. When contained, REM fixes O (oxygen) and S (sulfur) as inclusions, and increases the hot workability and creep ductility of the base metal. However, if the content of REM is too high, the hot workability and creep ductility of the base metal will decrease. Therefore, the content of REM is 0 to 0.100%. A preferable lower limit of the content of REM is more than 0%, more preferably is 0.001%, and further preferably is 0.002%. A preferable upper limit of the content of REM is 0.080%, and further preferably is 0.060%.

In the present description, the term "REM" includes at least one or more elements among Sc, Y, and lanthanoids (elements from La with atomic number 57 through Lu with atomic number 71), and the term "content of REM" means the total content of these elements.

Regarding Formula (1)

The chemical composition of the austenitic stainless steel material of the present embodiment, in addition, satisfies Formula (1).

$$21.9Mo + 5.9W - 5.0 \geq 0 \tag{1}$$

Where, a content (mass %) of a corresponding element in the chemical composition is substituted for each symbol of an element in Formula (1).

Here, it is defined that $F1 = 21.9Mo + 5.9W - 5.0$. F1 is an index of the amount of $M_{23}C_6$-type carbides formed in the steel material. Mo and W each replace Cr at the M site of Cr carbides, and lower the free energy of the Cr carbides. Thus, Mo and W suppress formation of Cr carbides. In addition, the diffusion velocity of Mo and W is slower than the diffusion velocity of Cr. Therefore, the growth rate of Cr carbides in which Cr was replaced with Mo or W at the M site becomes slow.

If F1 is 0 or more, an amount of Mo and W that is capable of suppressing the formation of Cr carbides is sufficiently contained. Therefore, formation and growth of Cr carbides during welding and during use of the steel material at an average operation temperature of 400 to 700° C. can be sufficiently suppressed. As a result, even in a case where the steel material is used for operations for a long time period at the aforementioned average operation temperature after welding with higher heat input has been performed on the steel material, excellent sensitization resistance properties are obtained. A preferable lower limit of F1 is 0.1, more preferably is 0.2, further preferably is 0.5, further preferably is 1.0, further preferably is 1.5, and further preferably is 2.0. Although the upper limit of F1 is not particularly limited, when taking into consideration the maximum content of Mo and the maximum content of W in the chemical composition, the upper limit is 99.45. F1 is a value obtained by rounding off the second decimal place of the obtained numerical value (that is, F1 is the first decimal place).

Method for Analyzing Chemical Composition of Austenitic Stainless Steel Material The chemical composition of the austenitic stainless steel material of the present embodiment can be determined by a well-known component analysis method. Specifically, when the austenitic stainless steel material is a pipe, a drill is used to perform piercing at a center position of the wall thickness to generate machined chips, and the machined chips are collected. In a case where the austenitic stainless steel material is a steel plate, a drill is used to perform piercing at the center position of the plate width and also at the center position of the plate thickness to generate machined chips, and the machined chips are collected. In a case where the austenitic stainless steel material is a steel bar, a drill is used to perform piercing at an R/2 position to generate machined chips, and the machined chips are collected. Here, the term "R/2 position" means the center position of a radius R in a cross section perpendicular to the longitudinal direction of the steel bar.

The collected machined chips are dissolved in acid to obtain a liquid solution. The liquid solution is subjected to ICP-OES (inductively Coupled Plasma Optical Emission Spectrometry), and elementary analysis of the chemical composition is performed. The content of C and the content of S are determined by a well-known high-frequency combustion method. Specifically, the content of C and the content of S are determined by combusting the aforementioned liquid solution in an oxygen gas flow by high-frequency heating, and detecting the generated carbon dioxide and sulfur dioxide. The chemical composition of the austenitic stainless steel material can be determined by the above analysis method.

Regarding Precipitates (Residue) in Austenitic Stainless Steel Material

In the austenitic stainless steel material of the present embodiment, in addition, the content of Nb in a residue obtained by an extraction residue method is, in mass %, 0.050 to 0.267%, and the content of Cr in the residue is, in mass %, 0.125% or less.

Here, the term "content of Nb in a residue" means the proportion (mass %) of the mass of the content of Nb in the residue with respect to the mass of the austenitic stainless steel material (mass of austenitic stainless steel material mainly electrolyzed by the extraction residue method). The term "content of Cr in the residue" means the proportion (mass %) of the mass of the content of Cr in the residue with respect to the mass of the austenitic stainless steel material (mass of austenitic stainless steel material mainly electrolyzed by the extraction residue method).

In a case where the content of Nb in a residue obtained by an extraction residue method is, in mass %, 0.050 to 0.267%, and the content of Cr in the residue is, in mass %, 0.125% or less, the proportion occupied by Cr—Nb nitrides among the precipitates in the austenitic stainless steel material is large. In other words, this means that when the content of Nb in a residue obtained by an extraction residue method is, in mass %, 0.050 to 0.267%, and the content of Cr in the residue is, in mass %, 0.125% or less, the amount of precipitates other than Cr—Nb nitrides (that is, Cr carbides, $Cr_2N$, other carbides, nitrides, and carbo-nitrides and the like) is sufficiently small with respect to the amount of Cr—Nb nitrides.

If the content of Nb in the residue is less than 0.050%, it means that Cr—Nb nitrides have not precipitated sufficiently in the steel material. In this case, sufficient sensitization resistance properties will not be obtained if the steel material which has undergone welding with higher heat input is held for a long time period at an average operation temperature of 400 to 700° C.

On the other hand, if the content of Nb in the residue is more than 0.267% and/or the content of Cr in the residue is more than 0.125%, it means that Cr—Nb nitrides or other precipitates which are large in number or which are coarse have already been formed at grain boundaries in the steel material before use at an average operation temperature of 400 to 700° C. Therefore, if the steel material which has undergone welding with higher heat input is held for a long time period at an average operation temperature of 400 to 700° C., Cr depleted zones will excessively form, and consequently sufficient sensitization resistance properties will not be obtained.

In the residue extracted by the extraction residue method, a preferable lower limit of the content of Nb is 0.052%, more preferably is 0.054%, and further preferably is 0.055%. A preferable upper limit of the content of Nb in the residue is 0.265%, more preferably is 0.263%, further preferably is 0.260%, further preferably is 0.250%, and further preferably is 0.240%.

A preferable upper limit of the content of Cr in the residue obtained by the extraction residue method is 0.120%, more preferably is 0.110%, further preferably is 0.100%, further preferably is 0.090%, and further preferably is 0.080%. The lower limit of the content of Cr is not particularly limited. A preferable lower limit of the content of Cr is 0.001%, more preferably is 0.003%, and further preferably is 0.005%.

Method for Measuring Chemical Composition in Residue

The content of Nb and the content of Cr in the residue can be measured by the following method. A test specimen is taken from the austenitic stainless steel material. A cross section perpendicular to the longitudinal direction of the test specimen may be circular or may be rectangular. If the austenitic stainless steel material is a pipe, the test specimen is taken in a manner so that the center of a cross section perpendicular to the longitudinal direction of the test specimen is the center position of the wall thickness of the pipe, and the longitudinal direction of the test specimen coincides with the longitudinal direction of the pipe. If the austenitic stainless steel material is a steel plate, the test specimen is taken in a manner so that the center of a cross section perpendicular to the longitudinal direction of the test specimen is the center position of the plate width and the center position of the plate thickness of the steel plate, and the longitudinal direction of the test specimen coincides with the longitudinal direction of the steel plate. If the austenitic stainless steel material is a steel bar, the test specimen is taken in a manner so that the center of a cross section perpendicular to the longitudinal direction of the test specimen is the R/2 position of the steel bar, and the longitudinal direction of the test specimen coincides with the longitudinal direction of the steel bar.

The surface of the taken test specimen is polished to remove about 50 µm by preliminary electropolishing to obtain a newly formed surface. The electropolished test specimen is subjected to electrolyzation (main electrolyzation) using an electrolyte solution (10% acetylacetone+1% tetra-ammonium+methanol). The electrolyte solution after main electrolyzation is passed through a 0.2 µm filter to capture residue. The obtained residue is subjected to acid decomposition, and the Nb mass in the residue and the Cr mass in the residue are determined by ICP (inductively coupled plasma) emission spectrometry. In addition, the mass of the base metal (austenitic stainless steel material) mainly electrolyzed is determined. Specifically, the mass of the test specimen before the main electrolyzation and the mass of the test specimen after the main electrolyzation are measured. Then, a value obtained by subtracting the mass of the test specimen after the main electrolyzation from the mass of the test specimen before the main electrolyzation is defined as the base metal mass mainly electrolyzed.

The Nb mass in the residue is divided by the base metal mass mainly electrolyzed to determine the content (mass %) of Nb in the residue. In other words, the content (mass %) of Nb in the residue is determined based on the following Formula (i). In addition, the Cr mass in the residue is divided by the base metal mass mainly electrolyzed to determine the content (mass %) of Cr in the residue. In other words, the content (mass %) of Cr in the residue is determined based on the following Formula (ii).

$$\text{Content of Nb in residue} = \text{Nb mass in residue/base metal mass} \times 100 \quad \text{(i)}$$

$$\text{Content of Cr in residue} = \text{Cr mass in residue/base metal mass} \times 100 \quad \text{(ii)}$$

As described above, in the austenitic stainless steel material of the present embodiment, the content of each element in the chemical composition is within the aforementioned range, and the chemical composition satisfies Formula (1). In addition, the content of Nb in a residue obtained by an extraction residue method is, in mass %, 0.050 to 0.267%, and the content of Cr in the residue is, in mass %, 0.125% or less. Therefore, the austenitic stainless steel material of the present embodiment has excellent sensitization resistance properties even after use for a long time period at an average operation temperature of 400 to 700° C. after welding with higher heat input.

Here, having excellent sensitization resistance properties even after use for a long time period at an average operation temperature of 400 to 700° C. after welding with higher heat input means the following.

An square type test specimen is taken from the austenitic stainless steel material. If the austenitic stainless steel material is a pipe, the square type test specimen is taken in a manner so that the center of a cross section perpendicular to the longitudinal direction of the test specimen is the center position of the wall thickness of the pipe, and the longitudinal direction of the test specimen coincides with the longitudinal direction of the pipe. If the austenitic stainless steel material is a steel plate, the square type test specimen is taken in a manner so that the center of a cross section perpendicular to the longitudinal direction of the test specimen is the center position of the plate width and the center position of the plate thickness of the steel plate, and the longitudinal direction of the test specimen coincides with the longitudinal direction of the steel plate. If the austenitic stainless steel material is a steel bar, the square type test specimen is taken in a manner so that the center of a cross section perpendicular to the longitudinal direction of the test specimen is the R/2 position of the steel bar, and the longitudinal direction of the test specimen coincides with the longitudinal direction of the steel bar.

The length of the square type test specimen is not particularly limited, and for example is 100 mm. The cross section (transverse cross-section) perpendicular to the longitudinal direction of the square type test specimen is not particularly limited, and for example is a rectangle of 10 mm×10 mm.

A high frequency heat cycle apparatus is used to apply the following heat history to the square type test specimen. Specifically, the temperature of a central portion having a predetermined width (for example, 10 mm) at the center position in the longitudinal direction of the square type test specimen is raised from normal temperature to 1350 to 1400° C. at a rate of 70 to 100° C./sec in the atmosphere. Further, the central portion is held at the raised temperature for 1 to 60 seconds. Thereafter, the square type test specimen is cooled to normal temperature at a cooling rate of 20° C./sec. By applying the above heat history to the square type test specimen, test specimen simulated welded joint with higher heat input is prepared.

The following long-term sensitization treatment is then performed using the test specimen simulated welded joint with higher heat input. The test specimen simulated welded joint with higher heat input is charged into a heat treatment furnace. In the heat treatment furnace, the test specimen simulated welded joint with higher heat input is held for 10,000 hours at 550° C. in the atmosphere at atmospheric pressure (sensitization treatment). After 10,000 hours passes, the test specimen simulated welded joint with higher heat input is extracted from the heat treatment furnace and allowed to cool.

The following Strauss test and electrochemical potentiokinetic reactivation method are performed on the high heat input welded joint simulation test specimen subjected to the long-term sensitization treatment.

Strauss Test (Sulfuric Acid-Copper Sulfate Corrosion Test)

A Strauss test in accordance with ASTM A262-15, Practice E, is performed as follows. From the test specimen simulated welded joint with higher heat input which was subjected to the long-term sensitization treatment, a plate-shaped test specimen is taken in a manner so that the central portion is at the center position in the longitudinal direction of the plate-shaped test specimen. The size of the plate-shaped test specimen is not particularly limited. The size of the plate-shaped test specimen is, for example, a thickness of 2 mm, a width of 10 mm, and a length of 80 mm. The plate-shaped test specimen is immersed in a copper sulfate test solution containing 16% sulfuric acid and boiled for 15 hours. Thereafter, the plate-shaped test specimen is taken out from the copper sulfate test solution. A bending test is performed on the plate-shaped test specimen that was taken out. In the bending test, the plate-shaped test specimen is bent 180° in the atmosphere around the center position in the longitudinal direction of the test specimen simulated welded joint with higher heat input. The bent part of the bent test specimen is then cut. The cut surface is observed with a 20× optical microscope. If a crack is observed, the length of the crack is determined. If a crack is not observed or if a crack is observed and the length of the crack is 100 μm or less, it is determined that the test specimen is excellent in sensitization resistance properties.

Electrochemical Potentiokinetic Reactivation Method

An electrochemical reactivation test in accordance with ASTM G108-94 is performed using the test specimen simulated welded joint with higher heat input subjected to the long-term sensitization treatment. Specifically, a plate-shaped test specimen is taken from a central portion (portion to which high heat was applied) of the test specimen simulated welded joint with higher heat input subjected to the long-term sensitization treatment. In the taken plate-shaped test specimen, a region other than a surface portion with an evaluation area of 100 mm² is masked. Employing the masked plate-shaped test specimen as an electrode, the plate-shaped test specimen is immersed in a 0.5 mol sulfuric acid+0.01 mol potassium thiocyanate solution with a volume of 200 cm³ at a temperature of 30° C. Next, the plate-shaped test specimen is scanned in the noble direction from the spontaneous potential to 300 mV with a linear polarization at a polarization rate of 100 mV/min. After reaching 300 mV based on a saturated calomel electrode, scanning is immediately performed in the base direction to the original spontaneous potential. The current that flows during application of a voltage in the noble direction (outward path) is measured. Then, the current that flows during application of a voltage in the base direction (return path) is measured. Based on obtained current values, the reactivation ratio (%) is defined as follows.

Reactivation ratio=(maximum anodic current on return path/maximum anodic current on outward path)×100

The lower the reactivation ratio is, the lower the degree of sensitization (DOS) is, and the higher the sensitization resistance properties are. When the reactivation ratio is 10% or less, it is determined that the steel material is excellent in sensitization resistance properties.

When the test specimen simulated welded joint with higher heat input subjected to the long-term sensitization treatment undergoes the Strauss test in accordance with ASTM A262-15, Practice E, if a crack is not observed, or even though a crack is observed, the length of the crack is 100 µm or less, and the reactivation ratio obtained in the electrochemical reactivation test in accordance with ASTM G108-94 is 10% or less, it is determined that the steel material has excellent sensitization resistance properties even after use for a long time period at an average operation temperature of 400 to 700° C. after welding with higher heat input.

Regarding Steel Material Having Enhanced Polythionic Acid SCC Resistance and Naphthenic Acid Corrosion Resistance With the recent decline in gasoline prices, the proportion of low-priced, low-grade crude oil containing naphthenic acid being used in chemical plant facilities is increasing. Therefore, in some cases, steel materials that are utilized in chemical plant facilities are required to have excellent naphthenic acid corrosion resistance. Further, in the case of steel materials that are utilized in heating furnace pipes of crude distillation units and vacuum distillation units or the like, sulfur is contained in crude oil in order to suppress adhesion of a large amount of cork generated in the distillation process. The adhesion of cork is suppressed by the sulfur contained in the crude oil. However, due to the sulfur contained in the crude oil, polythionic acid stress-corrosion cracking (hereunder, also referred to as "polythionic acid SCC") is likely to occur in the steel material. Therefore, a steel material that is to be used in chemical plant facilities may also be required to have excellent polythionic acid SCC resistance.

In the case of obtaining sufficient polythionic acid SCC resistance and sufficient naphthenic acid corrosion resistance, preferably the austenitic stainless steel material of the present embodiment also satisfies the following requirements. (I) The content of Mo is 2.50 to 4.50%, and the content of Co is 0.01 to 1.00%. (II) The chemical composition of the steel material satisfies Formula (2) and Formula (3).

$$2 \leq 73W + 5Co \leq 60 \tag{2}$$

$$0.20 \leq Nb + 0.1W \leq 0.58 \tag{3}$$

(III) The content of Nb in a residue obtained by an extraction residue method is, in mass %, 0.065 to 0.245%, and the content of Cr in the residue is, in mass %, 0.104% or less.

Hereunder, (I) to (III) are described.

Regarding (I)

In the chemical composition of the austenitic stainless steel material of the present embodiment, when the content of Mo is 2.50% or more, as mentioned above, on the premise that the contents of other elements are within the range of the present embodiment and that the chemical composition satisfies Formula (1), excellent naphthenic acid corrosion resistance is obtained. In addition, W and Co increase the polythionic acid SCC resistance. Therefore, when it is an objective to obtain sufficient polythionic acid SCC resistance and sufficient naphthenic acid corrosion resistance, in the austenitic stainless steel material the content of Mo is 2.50 to 4.50%, and the content of Co is 0.01 to 1.00%.

Regarding (II)

The chemical composition of the steel material also satisfies Formula (2) and Formula (3).

$$2 \leq 73W + 5Co \leq 60 \tag{2}$$

$$0.20 \leq Nb + 0.1W \leq 0.58 \tag{3}$$

Where, a content (mass %) of a corresponding element in the chemical composition is substituted for each symbol of an element in Formula (2) and Formula (3).

Hereunder, Formula (2) and Formula (3) are described.

Regarding Formula (2)

It is defined that F2=73W+5Co. F2 is an index relating to polythionic acid SCC resistance, and liquation cracking resistance during welding with higher heat input. When F2 is less than 2, the total content of W and Co in the chemical composition of the austenitic stainless steel material is insufficient. In this case, the polythionic acid SCC resistance of the steel material decreases. On the other hand, if F2 is more than 60, in a case where the content of Mo is 2.50% or more, W and Co promote formation of intermetallic compounds such as Laves phases. In this case, intermetallic compounds will excessively form. Therefore, the strength in the grains will be excessively high, and the strength difference between the inside of the grains and the grain boundaries will be large. Consequently, stress concentration will occur at grain boundary interfaces. As a result, during welding with higher heat input, the liquation cracking resistance will decrease.

In the chemical composition of the austenitic stainless steel material of the present embodiment, if the content of Mo is 2.50 to 4.50%, the content of Co is 0.01 to 1.00% and, in addition, F2 is 2 to 60, on the premise that the contents of other elements are within the range of the present embodiment, sufficient polythionic acid SCC resistance is obtained, and the occurrence of liquation cracking during welding with higher heat input can be suppressed. A preferable lower limit of F2 is 3, more preferably is 4, and further preferably is 5. A preferable upper limit of F2 is 58, more preferably is 55, further preferably is 53, and further preferably is 50. F2 is a value obtained by rounding off the first decimal place of the obtained numerical value.

Regarding Formula (3)

It is defined that F3=Nb+0.1W. F3 means the amount of effective Nb. Nb and W each combine with C to form carbides, and thereby reduce the amount of dissolved C in the steel material. By this means, formation of Cr carbides in the steel material is suppressed, and the polythionic acid SCC resistance of the steel material is increased. However, when the content of N in the steel material is 0.05 to 0.15%, if the total content of Nb and W is too high, Nb precipitates as typified by Laves phases will excessively form. In this case, during welding with higher heat input, liquation cracking may sometimes occur at the HAZ, and the liquation cracking resistance may decrease.

If F3 is less than 0.20, formation of Cr carbides cannot be sufficiently suppressed, and the polythionic acid SCC resistance of the steel material will decrease. On the other hand, if F3 is more than 0.58, Nb precipitates as typified by Laves phases will excessively form, and during welding with higher heat input, liquation cracking may occur at the HAZ. In the austenitic stainless steel material of the present embodiment, in addition, when the above (I) and (II) are satisfied, that is, if F3 is 0.20 to 0.58%, excellent polythionic acid SCC resistance is obtained, and during welding with higher heat input, liquation cracking in the HAZ can be suppressed.

A preferable lower limit of F3 is 0.22, more preferably is 0.24, and further preferably is 0.26. A preferable upper limit of F3 is 0.56, more preferably is 0.54, further preferably is 0.50, further preferably is 0.48, and further preferably is 0.45. F3 is a value obtained by rounding off the third decimal place of the obtained numerical value.

Regarding (III)

In a case where the austenitic stainless steel material of the present embodiment satisfies (I) and (II), in addition, excellent polythionic acid SCC resistance is obtained if the content of Nb in a residue obtained by an extraction residue method is, in mass %, 0.065 to 0.245%, and the content of Cr in the residue is, in mass %, 0.104% or less.

If the content of Nb in a residue extracted by an extraction residue method is, in mass %, 0.065 to 0.245%, and the content of Cr in the residue is, in mass %, 0.104% or less, the proportion occupied by Cr—Nb nitrides among precipitates in the austenitic stainless steel material will be sufficiently large, and the grain boundary area will sufficiently increase, and therefore excellent polythionic acid SCC resistance will be obtained.

If the content of Nb in the residue is less than 0.065%, it means that Cr—Nb nitrides have not adequately precipitated in the steel material to the extent that sufficient polythionic acid SCC resistance is obtained. In this case, sufficient polythionic acid SCC resistance will not be obtained if the steel material after undergoing welding with higher heat input is held for a long time period at an average operation temperature of 400 to 700° C.

On the other hand, in a case where the content of Nb in the residue is more than 0.245% and/or the content of Cr in the residue is more than 0.104%, it means that Cr—Nb nitrides which are large in number or are coarse to an extent that causes the polythionic acid SCC resistance to decrease have already been formed at grain boundaries in the steel material before use at an average operation temperature of 400 to 700° C. Therefore, if the steel material which has undergone welding with higher heat input is held for a long time period at an average operation temperature of 400 to 700° C., sufficient polythionic acid SCC resistance will not be obtained.

In a case where the austenitic stainless steel material of the present embodiment satisfies (I) and (II), and the content of Nb in a residue obtained by an extraction residue method is, in mass %, 0.065 to 0.245%, and the content of Cr in the residue is, in mass %, 0.104% or less, excellent polythionic acid SCC resistance and naphthenic acid corrosion resistance are obtained.

A preferable lower limit of the content of Nb in the residue extracted by the extraction residue method is 0.070%, more preferably is 0.075%, further preferably is 0.085%, and further preferably is 0.090%. A preferable upper limit of the content of Nb in the residue is 0.240%, more preferably is 0.235%, and further preferably is 0.230%.

A preferable upper limit of the content of Cr in the residue extracted by the extraction residue method is 0.100%, more preferably is 0.095%, and further preferably is 0.090%, and a lower limit of the content of Cr is not particularly limited.

A preferable lower limit of the content of Cr is 0.001%, more preferably is 0.003%, and further preferably is 0.005%.

As described above, if the content of each element in the chemical composition of the austenitic stainless steel material of the present embodiment is within the range of the present embodiment, Formula (1) is satisfied, and the aforementioned (I) to (II) are satisfied, excellent naphthenic acid corrosion resistance, excellent polythionic acid SCC resistance, and excellent liquation cracking resistance are obtained. Here, the meaning of the phrases "excellent naphthenic acid corrosion resistance", "excellent polythionic acid SCC resistance", and "excellent liquation cracking resistance" is as follows.

Naphthenic Acid Corrosion Resistance

A test specimen is taken from the austenitic stainless steel material. If the austenitic stainless steel material is a pipe, the test specimen is taken in a manner so that the center of a cross section perpendicular to the longitudinal direction of the test specimen is the center position of the wall thickness of the pipe, and the longitudinal direction of the test specimen coincides with the longitudinal direction of the pipe. If the austenitic stainless steel material is a steel plate, the test specimen is taken in a manner so that the center of a cross section perpendicular to the longitudinal direction of the test specimen is the center position of the plate width and the center position of the plate thickness of the steel plate, and the longitudinal direction of the test specimen coincides with the longitudinal direction of the steel plate. If the austenitic stainless steel material is a steel bar, the test specimen is taken in a manner so that the center of a cross section perpendicular to the longitudinal direction of the test specimen is the R/2 position of the steel bar, and the longitudinal direction of the test specimen coincides with the longitudinal direction of the steel bar. The size of the test specimen is not particularly limited. The size of the test specimen is, for example, a thickness of 2 mm, a width of 10 mm, and a length of 30 mm. The taken test specimen is immersed in a 100% cyclohexanecarboxylic acid solution at 200° C. for 720 hours under normal pressure. After immersion for 720 hours, the test specimen is ultrasonically cleaned using acetone for 3 minutes.

The difference between the mass of the test specimen before the test and the mass of the test specimen after ultrasonic cleaning is calculated as the corrosion loss. In addition, the corrosion rate (mm/year) is determined based on the surface area, specific gravity, and test time of the test specimen. When the corrosion rate is 0.01 mm/year or less, it is determined that the austenitic stainless steel material is excellent in naphthenic acid corrosion resistance.

Polythionic Acid SCC Resistance

A test specimen simulated welded joint with higher heat input of the same type as in the aforementioned test for evaluating the sensitization resistance properties is prepared. The aforementioned long-term sensitization treatment is performed on the test specimen simulated welded joint with higher heat input. From the test specimen simulated welded joint with higher heat input that underwent the long-term sensitization treatment, a plate-shaped test specimen is taken in a manner so that the central portion is at the center position in the longitudinal direction of the plate-shaped test specimen. The size of the plate-shaped test specimen is not particularly limited. The size of the plate-shaped test specimen is, for example, a thickness of 2 mm, a width of 10 mm, and a length of 75 mm. A polythionic acid SCC resistance evaluation test is performed by the following method using the taken plate-shaped test specimen. The plate-shaped test specimen is bent around a punch having an inner radius of 5 mm to form a U-bend shape. The U-bend-shaped test specimen is immersed for 100 hours at normal temperature in a 1% $K_2S_4O_6$ liquid solution adjusted to PH=2 using sulfuric acid. In the test specimen after immersion, the bent part of the bent test specimen is cut in a direction perpendicular to the longitudinal direction, and the cut surface is observed with a 20× optical microscope. If a crack is observed, the depth of the crack in the cut surface is determined. If a crack is not observed, or if a crack is observed and the depth of the crack is less than 20 μm, it is determined that the austenitic stainless steel material is excellent in polythionic acid SCC resistance.

Liquation Cracking Resistance Evaluation Test

The center position in the longitudinal direction of the test specimen simulated welded joint with higher heat input is cut in a direction perpendicular to the longitudinal direction. The cut surface is adopted as the observation surface. The observation surface is etched with mixed acid. An arbitrary three visual fields (each visual field is 250 μm×250 μm) on the etched observation surface are observed with a 400× optical microscope. In the observed three visual fields, the presence or absence of partial liquation traces at grain boundaries is determined.

In the cut surface of the three visual fields, among partial liquation traces generated at the grain boundaries, if partial liquation traces having a length of 25 μm or more are not observed, or if partial liquation traces having a length of 25 μm or more are observed but partial liquation traces having a length of 50 μm or more are not observed, it is determined that the liquation cracking resistance is high.

Shape of Austenitic Stainless Steel Material of Present Embodiment

The shape of the austenitic stainless steel material of the present embodiment is not particularly limited. The austenitic stainless steel material of the present embodiment may be a pipe, may be a steel plate, or may be a steel bar. The austenitic stainless steel material of the present embodiment may be a forged product, or may be a cast product.

Regarding Uses of Austenitic Stainless Steel Material of Present Embodiment

The austenitic stainless steel material of the present embodiment is suitable for use for apparatuses which are used at an average operation temperature of 400 to 700° C. The austenitic stainless steel material of the present embodiment is, in particular, suitable for use for apparatuses which are used for a long time period at an average operation temperature of 400 to 700° C. after being subjected to welding with higher heat input. The temperature of 400 to 700° C. is the average operation temperature, and even if the operation temperature is temporarily more than 700° C., as long as the average operation temperature is 400 to 700° C., it is suitable for use of the austenitic stainless steel material of the present embodiment. The highest temperature reached by these apparatuses may be 750° C. Such apparatuses are, for example, apparatuses in chemical plant facilities that are typified by oil refining facilities and petrochemical facilities. These apparatuses are equipped with, for example, a heating furnace pipe, a tank, and piping. Further, the austenitic stainless steel material of the present embodiment may be utilized in chemical plant facilities in which the average operation temperature is less than 400° C.

In a case where the steel material of the present embodiment satisfies the aforementioned (I) to (II), that is, when the chemical composition contains Mo: 2.50 to 4.50% and Co: 0.01 to 1.00%, and also satisfies Formula (2) and Formula (3), and in addition, the content of Nb in a residue obtained by an extraction residue method is, in mass %, 0.065 to 0.245%, and the content of Cr in the residue is, in mass %, 0.104% or less, the steel material is suitable for use in chemical plant facilities in which polythionic acid SCC resistance and naphthenic acid corrosion resistance are required.

Note that, the austenitic stainless steel material of the present embodiment can also of course be used for facilities other than chemical plant facilities. Examples of such facilities other than chemical plant facilities include thermal power generation boiler facilities (for example, equipment such as boiler tubes) for which use at an average operation temperature of around 400 to 700° C. is envisioned, similarly to chemical plant facilities.

Regarding Welded Joint of Present Embodiment

FIG. 1 is a plan view illustrating one example of a welded joint of the present embodiment. Referring to FIG. 1, a welded joint 1 according to the present embodiment includes a pair of austenitic stainless steel materials 100 and a weld metal 200. The weld metal 200 is arranged between the pair of austenitic stainless steel materials 100. The weld metal 200 is formed between the pair of austenitic stainless steel materials 100, and is connected to the pair of austenitic stainless steel materials 100. In the following description, the austenitic stainless steel material 100 is also referred to as a "base metal" 100.

The ends of the pair of base metals 100 are, for example, bevel preparation. The weld metal 200 is formed by butting together the ends of the pair of base metals 100 having the bevelled ends, and thereafter performing single pass welding or multi pass welding. The welding methods include, for example, gas tungsten arc welding (GTAW), shielded metal arc welding (SMAW), flux cored arc welding (FCAW), gas metal arc welding (GMAW), and submerged arc welding (SAW).

Figure 2:
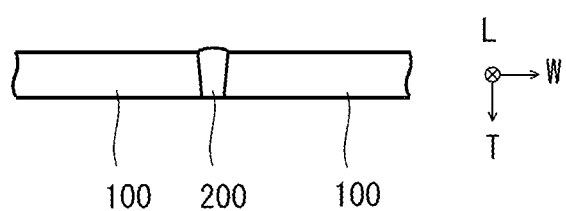
FIG. 2 is a cross-sectional view of the welded joint of FIG. 1 which has been cut in a width direction of the weld metal.

In FIG. 1, the direction in which the weld metal 200 extends is defined as a "extending direction of the weld metal L". The direction perpendicular to the extending direction of the weld metal L is defined as a "width direction of the weld metal W". The direction that is perpendicular to the extending direction of the weld metal L and the width direction of the weld metal W is defined as a "thickness direction of the weld metal T". FIG. 2 is a cross-sectional view illustrating a state in which the welded joint 1 shown in FIG. 1 has been cut in the width direction of the weld metal W. As illustrated in FIG. 1 and FIG. 2, the weld metal 200 is formed (arranged) between the pair of base metals 100.

Figure 3:
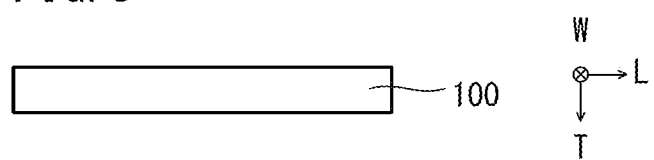
FIG. 3 is a cross-sectional view of the welded joint of FIG. 1 which has been cut in a extending direction of the weld metal.
Figure 4:
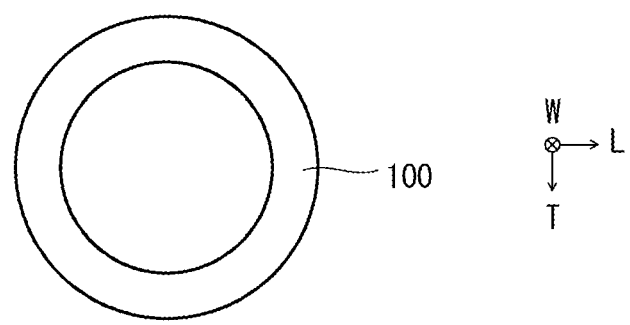
FIG. 4 is a cross-sectional view of the welded joint which has been cut in the extending direction of the weld metal, which is different from FIG. 3.

FIG. 3 is a cross-sectional view illustrating a state in which the welded joint 1 shown in FIG. 1 has been cut in the extending direction of the weld metal L. FIG. 4 is a cross-sectional view illustrating a state in which the welded joint 1 has been cut in the extending direction of the weld metal L, which is different from FIG. 3. As illustrated in FIG. 3, the base metal 100 may be a steel plate. Further, as illustrated in FIG. 4, a cross section perpendicular to the longitudinal direction of the base metal 100 may be a circular tube (that is, a pipe). Although not illustrated in the drawings, the base metal 100 may also be a steel bar.

Regarding Base Metal 100

Each of the pair of base metals 100 is the austenitic stainless steel material of the present embodiment that has the aforementioned excellent polythionic acid SCC resistance and excellent naphthenic acid corrosion resistance. In other words, the base metal 100 has a chemical composition that consists of, in mass %, C: 0.020% or less, Si: 1.50% or less, Mn: 2.00% or less, P: 0.045% or less, S: 0.0300% or less, Cr: 15.00 to 25.00%, Ni: 9.00 to 20.00%, N: 0.05 to 0.15%, Nb: 0.1 to 0.8%, Mo: 2.50 to 4.50%, W: 0.01 to 1.00%, Ti: 0 to 0.50%, Ta: 0 to 0.50%, V: 0 to 1.00%, Zr: 0 to 0.10%, Hf: 0 to 0.10%, Cu: 0 to 2.00%, Co: 0.01 to 1.00%, sol. Al: 0 to 0.030%, B: 0 to 0.0100%, Ca: 0 to 0.0200%, Mg: 0 to 0.0200%, rare earth metal: 0 to 0.100%, Sn: 0 to 0.010%, As: 0 to 0.010%, Zn: 0 to 0.010%, Pb: 0 to 0.010%, and Sb: 0 to 0.010%, with the balance being Fe and impurities, and satisfies Formula (1) to Formula (3), in which, in a residue obtained by an extraction residue method, a content of Nb is, in mass %, 0.065 to 0.245%, and a content of Cr is, in mass %, 0.104% or less.

Regarding Weld Metal 200

The chemical composition of the weld metal 200 is not particularly limited. It suffices that the weld metal 200 is formed using a well-known welding consumable. Examples of well-known welding consumables include, in accordance with AWS A5.9, welding consumables with the following standard names: ER NiCrCoMo-1, ER NiCrMo-3, NiCrCoMo-1, 22Cr-12Co-1 Al-9Mo-Ni, NiCrMo-3, and 22Cr-8Mo-3.5Nb—Ni.

Figure 5:
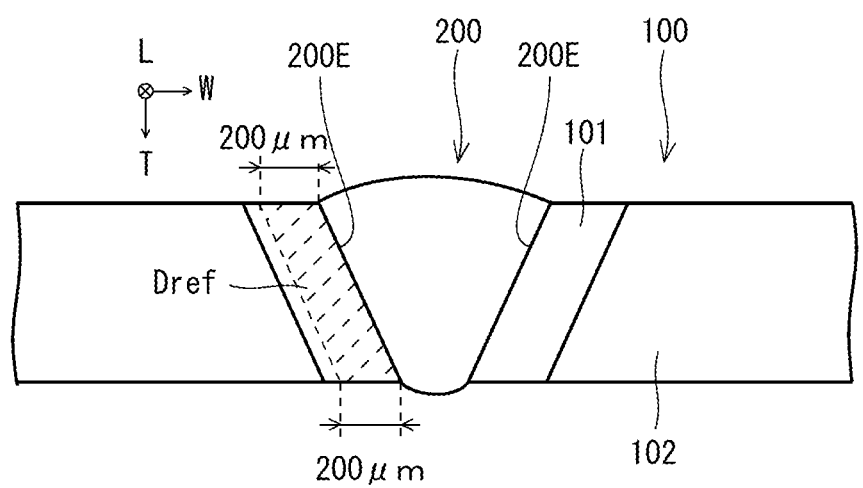
FIG. 5 is a view illustrating a cross section in a direction perpendicular to the extending direction of the weld metal, in the welded joint of the present embodiment.

Regarding Preferable Range of Average Grain Size R1 in Heat Affected Zone (HAZ) and Average Grain Size R2 in Portion Other than HAZ FIG. 5 is a view illustrating a cross section in a direction perpendicular to the extending direction of the weld metal L in the welded joint 1 of the present embodiment. Referring to FIG. 5, at the cross section in the direction perpendicular to the extending direction of the weld metal L of the welded joint 1, the base metal (austenitic stainless steel material) 100 includes a heat affected zone (HAZ) 101, and a portion 102 other than the HAZ 101. The HAZ 101 is a region of the base metal 100 that is adjacent to a fusion line 200E of the weld metal 200, and is a portion that receives a heat effect during welding. On the other hand, in the base metal 100, the portion other than the HAZ 101 will be referred to as a "normal portion 102". In the base metal 100, the normal portion 102 is a portion that substantially does not receive a heat effect during welding.

Referring to FIG. 5, in the cross section of the base metal 100 in the direction perpendicular to the extending direction of the weld metal L, a range of 200 μm which is within the HAZ 101 and which is in the width direction of the weld metal W from the fusion line 200E (region hatched with broken lines in FIG. 5) is defined as a "range Dref". The range Dref is one part of the HAZ 101. The average grain size in the range Dref is defined as an "average grain size R1 (μm)". In addition, in the cross section of the base metal 100, the average grain size in the portion other than the HAZ 101 (that is, the normal portion 102) is defined as an "average grain size R2 (μm)". At this time, preferably the average grain size R1 and the average grain size R2 satisfy Formula (4).

$$R1/R2 \leq 4.8 \tag{4}$$

Here, the average grain size R1 is measured by the following method. A test specimen including a cross section in a direction perpendicular to the extending direction of the weld metal L is taken from the welded joint 1. The cross section in the direction perpendicular to the extending direction of the weld metal L is adopted as the observation surface. The observation surface is mirror-polished. After mirror-polishing, the test specimen is subjected to etching using a 10% oxalate solution. On the etched observation surface, an arbitrary three visual fields inside the range Dref are observed with an optical microscope having a magnification of ×200, and photographic images are generated. Each visual field is set to a size of 100 μm×100 μm. In each visual field, a grain size number is determined by an intercept method according to JIS G 0551 (2013). The arithmetic mean value of the thus-determined three grain size numbers is determined, and is defined as the average grain size number. The average grain size R1 (μm) is determined based on the obtained average grain size number.

Similarly, the average grain size R2 is measured by the following method. Referring to FIG. 5, a test specimen including a cross section in a direction perpendicular to the extending direction of the weld metal L is taken from the normal portion 102 of the base metal 100 of the welded joint 1. The cross section in a direction perpendicular to the extending direction of the weld metal L is adopted as the observation surface. The observation surface is mirror-polished. After mirror-polishing, the test specimen is subjected to etching using a 10% oxalate solution. On the etched observation surface, an arbitrary three visual fields are observed with an optical microscope having a magnification of ×200, and photographic images are generated. Each visual field is set to a size of 100 μm×100 μm. In each visual field, a grain size number is determined by an intercept method according to JIS G 0551 (2013). The arithmetic mean value of the thus-determined three grain size numbers is determined, and is defined as the average grain size number. The average grain size R2 (μm) is determined based on the obtained average grain size number.

In the welded joint 1 of the present embodiment, when the base metal 100 is the aforementioned austenitic stainless steel material of the present embodiment, and the average grain size R1 in the HAZ 101 in the vicinity of the fusion line 200E and the average grain size R2 in the normal portion 102 satisfy Formula (4), the welded joint 1 of the present embodiment has even more excellent polythionic acid SCC resistance and even more excellent liquation cracking resistance, even after welding with higher heat input.

Method for Producing Austenitic Stainless Steel Material of Present Embodiment

A method for producing the austenitic stainless steel material of the present embodiment is described hereinafter. The method for producing an austenitic stainless steel material described hereinafter is merely one example of a method for producing the austenitic stainless steel material of the present embodiment. Accordingly, an austenitic stainless steel material having the structure described above may be produced by another production method than the production method described hereinafter. However, the production method described hereinafter is a preferable example of a method for producing the austenitic stainless steel material of the present embodiment.

The method for producing the austenitic stainless steel material of the present embodiment includes the following processes.

1. A process of preparing a starting material (preparation process)
2. A process of performing hot working on the starting material to produce an intermediate steel material (hot working process)
3. As required, a process of performing cold working after performing a pickling treatment on the intermediate steel material after the hot working process (cold working process)
4. A process of causing Cr—Nb nitrides to precipitate in the intermediate steel material after the hot working process or after the cold working process (heat treatment process to promote Cr—Nb nitrides) Hereunder, each of these processes is described.

1. Preparation Process

In the preparation process, a starting material having the aforementioned chemical composition is prepared. The starting material may be supplied by a third party or may be produced. The starting material may be an ingot, a slab, a bloom, or a billet. In the case of producing the starting material, the starting material is produced by the following method. Molten steel having the aforementioned chemical composition is produced. The produced molten steel is used to produce an ingot by an ingot-making process. The produced molten steel may also be used to produce a slab, a bloom, or a billet by a continuous casting process. Hot working may be performed on the produced ingot, slab, or bloom to produce a billet. For example, hot forging may be performed on the ingot to produce a cylindrical billet, and the billet may be used as a starting material. In such a case, the temperature of the starting material immediately before the start of the hot forging is not particularly limited, and for example is 1000 to 1300° C. The method of cooling the starting material after the hot forging is not particularly limited.

2. Hot Working Process

In the hot working process, hot working is performed on the starting material prepared in the preparation process to produce an intermediate steel material. The intermediate steel material, for example, may be a pipe, may be a steel plate, or may be a steel bar.

When the intermediate steel material is a pipe, the following working is performed in the hot working process. First, a cylindrical starting material is prepared. A through-hole is formed in the cylindrical starting material along the central axis thereof by machining. Hot extrusion, which is typified by the Ugine-Sejournet process, is performed on the cylindrical starting material in which the through-hole has been formed, to thereby produce an intermediate steel material (pipe). The temperature of the starting material immediately before performing the hot extrusion is not particularly limited. The temperature of the starting material immediately before performing the hot extrusion is, for example, 1000 to 1300° C. Instead of the hot extrusion process, a hot extrusion process may be performed.

Instead of the hot extrusion, a pipe may be produced by performing piercing-rolling according to the Mannesmann process. In such a case, a round billet is pierced and rolled with a piercing machine. In the case of performing piercing-rolling, whilst the piercing ratio is not particularly limited, for example the piercing ratio is 1.0 to 4.0. The pierced and rolled round billet is further subjected to hot rolling with a mandrel mill, a reducer, a sizing mill or the like to produce a hollow shell. Whilst the cumulative reduction ratio of area in the hot working process is not particularly limited, for example, the reduction ratio of area is 20 to 80%. In the case where a pipe is produced by the hot working, whilst the pipe temperature (finishing temperature) immediately after the hot working is completed is not particularly limited, preferably the pipe temperature is 900° C. or more.

When the intermediate steel material is a steel plate, for example, one or a plurality of rolling machines equipped with a pair of work rolls is used in the hot working process. Hot rolling is performed on the starting material, such as a slab, using the rolling machine to produce a steel plate. The starting material is heated before the hot rolling, and the hot rolling is performed on the heated starting material. The temperature of the starting material immediately before the hot rolling is, for example, 1000 to 1300° C. In the case where a steel plate is produced by the hot working, whilst the steel plate temperature (finishing temperature) immediately after the hot working is completed is not particularly limited, preferably the steel plate temperature is 900° C. or more.

When the intermediate steel material is a steel bar, the hot working process includes, for example, a rough rolling process and a finish rolling process. In the rough rolling process, hot working is performed on the starting material to produce a billet. In the rough rolling process, for example, a blooming machine is used. The blooming machine is used to subject the starting material to blooming to produce a billet. If a continuous mill is arranged downstream of the blooming machine, the continuous mill may be used to further perform hot rolling on the billet obtained after performing the blooming, to thereby produce a billet of an even smaller size. In the continuous mill, for example, horizontal stands having a pair of horizontal rolls and vertical stands having a pair of vertical rolls are alternately arranged in a row. Whilst the starting material temperature immediately before the rough rolling process is not particularly limited, for example, the starting material temperature is 1000 to 1300° C. In the finish rolling process, the billet is first heated. Hot rolling is performed on the heated billet using the continuous mill to produce a steel bar. Whilst the heating temperature in the heating furnace in the finish rolling process is not particularly limited, for example, the heating temperature is 1000 to 1300° C. In the case where a steel bar is produced by the hot working, whilst the steel bar temperature (finishing temperature) immediately after the hot working is completed is not particularly limited, preferably the steel bar temperature is 900° C. or more.

3. Cold Working Process

A cold working process is performed as required. In other words, a cold working process need not be performed. In the case of performing a cold working process, cold working is performed after performing a pickling treatment on the intermediate steel material after the hot working. When the intermediate steel material is a pipe or a steel bar, the cold working is, for example, cold drawing or cold rolling. When the intermediate steel material is a steel plate, the cold working is, for example, cold rolling. By performing the cold working process, strain is imparted to the intermediate steel material before the heat treatment process to promote Cr—Nb nitrides. This allows the development of recrystallization and formation of uniform grains to occur during the heat treatment process to promote Cr—Nb nitrides. Whilst the reduction ratio of area in the cold working process is not particularly limited, for example, the reduction ratio of area is 10 to 90%.

4. Heat Treatment Process to Promote Cr—Nb Nitrides

In the heat treatment process to promote Cr—Nb nitrides, the intermediate steel material after the hot working process or after the cold working process is subjected to a heat treatment process to promote Cr—Nb nitrides. By this means, an appropriate amount of Cr—Nb nitrides is caused to precipitate while suppressing formation of other precipitates (Cr carbides, $Cr_2N$, other carbides, nitrides, and carbonitrides and the like). As a result, the content of Nb in a residue obtained by an extraction residue method from the produced austenitic stainless steel material can be made, in mass %, 0.050 to 0.267%, and the content of Cr in the residue can be made, in mass %, 0.125% or less.

The heat treatment process to promote Cr—Nb nitrides is performed by the following method. The intermediate steel material is charged into a heat treatment furnace in which the atmosphere inside the furnace is an atmosphere. Here, the term "atmosphere" means an atmosphere containing 78% or more by volume of nitrogen and 20% or more by volume of oxygen, which are gases that constitute the atmosphere.

Conditions of Heat Treatment Process to Promote Cr—Nb Nitrides

In the heat treatment process to promote Cr—Nb nitrides, the following three conditions (first condition, second condition, and third condition) are satisfied.

First Condition: Heat Treatment Temperature T in Heat Treatment Process to Promote Cr—Nb Nitrides In the heat treatment process to promote Cr—Nb nitrides, inside the furnace with the atmosphere, a heat treatment temperature T (° C.) is held in the following temperature range.

$$1000 \leq T \leq T_{max}$$

Where, Tmax (° C.) is as follows according to the content of Mo.

<1> When content of Mo is 0.10 to 1.00%:

$$T_{max} = T_x - 100(Mo+W) + 200C - 80Nb$$

<2> When content of Mo is more than 1.00% to less than 2.50%:

$$T_{max} = T_x - 50(Mo+W) + 200C - 80Nb$$

<3> When content of Mo is 2.50 to 4.50%:

$$T_{max} = T_x - 20(Mo+W) + 200C - 80Nb$$

Where, $T_x = 1300$.

If the heat treatment temperature T is less than 1000° C., precipitates such as Cr carbides that precipitated in the steel material in the hot working process will not sufficiently dissolve. In such a case, in the austenitic stainless steel material in which the contents of the elements in the chemical composition are within the range of the present embodiment and which satisfies Formula (1), the proportion of Nb carbides and Cr carbides among the precipitates markedly increases, and the proportion of Cr—Nb nitrides markedly decreases. Therefore, the content of Nb in the residue is, in mass %, more than 0.267%, and/or the content of Cr in the residue is, in mass %, more than 0.125%.

Further, in a case where the contents of the elements in the chemical composition of the steel material are within the range of the present embodiment, and the content of Mo is 2.50 to 4.50%, the content of Co is 0.01 to 1.00%, and Formula (1) to Formula (3) are satisfied, if the heat treatment temperature T is less than 1000° C., the content of Nb in the residue will be, in mass %, more than 0.245%, and/or the content of Cr in the residue will be, in mass %, more than 0.104%.

On the other hand, if the heat treatment temperature T is more than $T_{max}$, not only will Nb carbides and Cr carbides that formed in the steel material in the hot working process dissolve, but precipitation of Cr—Nb nitrides in the heat treatment process to promote Cr—Nb nitrides will also be insufficient. Consequently, the proportion of Cr—Nb nitrides present in the austenitic stainless steel material in which the contents of the elements in the chemical composition are within the range of the present embodiment and which satisfies Formula (1) will markedly decrease. As a result, the content of Nb in the residue will be, in mass %, less than 0.050%.

Further, in a case where the contents of the elements in the chemical composition of the steel material are within the range of the present embodiment, and the content of Mo is 2.50 to 4.50%, the content of Co is 0.01 to 1.00%, and Formula (1) to Formula (3) are satisfied, if the heat treatment temperature T is more than $T_{max}$, the content of Nb in the residue will be, in mass %, less than 0.065%.

If the heat treatment temperature T is 1000° C. or more and is $T_{max}$ or less, Cr carbides formed in the hot working process can be sufficiently dissolved, excessive formation of Nb carbides can be suppressed, and an appropriate amount of Cr—Nb nitrides can be formed. As a result, in the austenitic stainless steel material in which the contents of the elements in the chemical composition are within the range of the present embodiment and which satisfies Formula (1), the content of Nb in the residue will be, in mass %, 0.050 to 0.267% and the content of Cr in the residue will be 0.125% or less. Therefore, the sensitization resistance properties of the austenitic stainless steel material will improve.

Further, in a case where the contents of the elements in the chemical composition of the steel material are within the range of the present embodiment, and the content of Mo is 2.50 to 4.50%, the content of Co is 0.01 to 1.00%, and Formula (1) to Formula (3) are satisfied, the content of Nb in the residue will be, in mass %, 0.065 to 0.245% and the content of Cr in the residue will be 0.104% or less. Therefore, polythionic acid SCC resistance of the austenitic stainless steel material will improve.

At $T_{max}$, preferably $T_x$ is 1290, and more preferably is 1280.

Second Condition

In the heat treatment process to promote Cr—Nb nitrides, in addition, the heat treatment temperature T (° C.) and a holding time t (min) at the heat treatment temperature T satisfy the following conditions.

(A) When content of Mo in chemical composition is 0.10 to 1.00%

$$f1 \leq f2, \text{ and } f2 \leq f3$$

where, f1 to f3 are defined as follows:

$f1=760$ $f2=T \times \text{Log } 10(20\text{Nb}+0.1\text{Cr}+10\text{Mo}+t/60)$ $f3=1680$ (B) When content of Mo in chemical composition is more than 1.00% to less than 2.50%

$f1 \le f2$, and $f2 \le f3$ where, f1 to f3 are defined as follows:

$f1=1200$ $f2=T \times \text{Log } 10(20\text{Nb}+0.1\text{Cr}+10\text{Mo}+t/60)$ $f3=1900$ (C) When content of Mo in chemical composition is 2.50 to 4.50%

$f1 \le f2$, and $f2 \le f3$ where, f1 to B are defined as follows:

$f1=1520$ $f2=T \times \text{Log } 10(20\text{Nb}+0.1\text{Cr}+10\text{Mo}+t/60)$ $f3=2050$ In f2, the heat treatment temperature T (° C.) is substituted for T, and the holding time t (min) is substituted for t. The content (mass %) of the corresponding element is substituted for each symbol of an element in f2.

Here, f2 is a parameter of the heat treatment temperature T and holding time t required for forming an appropriate amount of Cr—Nb nitrides in a steel material in which the content of each element in the chemical composition is within the range of the present embodiment. Hereinafter, f2 is referred to as a "parameter to form Cr—Nb nitrides". Cr and Nb in the chemical composition are elements which constitute Cr—Nb nitrides. In addition, Mo is an element which affects formation of Cr—Nb nitrides, and also induces formation of Laves phases.

A value that differs based on the content of Mo in the chemical composition of the steel material is applied for f1. Specifically, when the content of Mo in the chemical composition of the steel material is 0.10 to 1.00%, f1=760. When the content of Mo in the chemical composition of the steel material is more than 1.00% to less than 2.50%, f1=1200. When the content of Mo in the chemical composition of the steel material is 2.50 to 4.50%, f1=1520.

Similarly to f1, a value that differs based on the content of Mo in the chemical composition of the steel material is applied for f3. Specifically, when the content of Mo in the chemical composition of the steel material is 0.10 to 1.00%, f3=1680. When the content of Mo in the chemical composition of the steel material is more than 1.00% to less than 2.50%, f3=1900. When the content of Mo in the chemical composition of the steel material is 2.50 to 4.50%, f3=2050.

If f2 is less than f1, the parameter to form Cr—Nb nitrides will be too low. In this case, in an austenitic stainless steel material in which the contents of the elements in the chemical composition are within the range of the present embodiment and which satisfies Formula (1), the proportion of Nb carbides and Cr carbides among the precipitates will be high, and the proportion of Cr—Nb nitrides will become markedly lower. Consequently, the content of Nb in the residue will be, in mass %, more than 0.267% and/or the content of Cr in the residue will be, in mass %, more than 0.125%.

Further, in a case where the contents of the elements in the chemical composition of the steel material are within the range of the present embodiment, and the content of Mo is 2.50 to 4.50%, the content of Co is 0.01 to 1.00%, and Formula (1) to Formula (3) are satisfied, if f2 is less than f1, the content of Nb in the residue will be, in mass %, more than 0.245% and/or the content of Cr in the residue will be, in mass %, more than 0.104%.

If f2 is more than f3, the parameter to form Cr—Nb nitrides will be too high. In this case, precipitation of Cr—Nb nitrides will be insufficient. Consequently, the proportion of Cr—Nb nitrides present in the austenitic stainless steel material will be markedly reduced. As a result, in an austenitic stainless steel material in which the contents of the elements in the chemical composition are within the range of the present embodiment and which satisfies Formula (1), the content of Nb in the residue will be less than 0.050 mass %.

Further, in a case where the contents of the elements in the chemical composition of the steel material are within the range of the present embodiment, and the content of Mo is 2.50 to 4.50%, the content of Co is 0.01 to 1.00%, and Formula (1) to Formula (3) are satisfied, if f2 is more than f3, the content of Nb in the residue will be, in mass %, less than 0.065%.

If f2 is f1 or more and f2 is f3 or less, the parameter to form Cr—Nb nitrides will be in an appropriate range. In this case, Cr—Nb nitrides precipitate in an appropriate amount. Therefore, in the austenitic stainless steel material in which the contents of the elements in the chemical composition are within the range of the present embodiment and which satisfies Formula (1), the content of Nb in the residue will be, in mass %, 0.050 to 0.267%, and the content of Cr in the residue will be, in mass %, 0.125% or less. As a result, the austenitic stainless steel material has excellent sensitization resistance properties.

Further, in a case where the contents of the elements in the chemical composition of the steel material are within the range of the present embodiment, and the content of Mo is 2.50 to 4.50%, the content of Co is 0.01 to 1.00%, and Formula (1) to Formula (3) are satisfied, if f2 is f1 or more and f2 is f3 or less, the content of Nb in the residue of the austenitic stainless steel material will be, in mass %, 0.065 to 0.245%, and the content of Cr in the residue will be, in mass %, 0.104% or less. As a result, the austenitic stainless steel material has excellent polythionic acid SCC resistance.

Third Condition

In the heat treatment process to promote Cr—Nb nitrides, in addition, after holding the steel material at the heat treatment temperature T° C. for the holding time t minutes, the steel material is cooled. At this time, at least when the steel material temperature is in the temperature region of 800 to 500° C., the steel material is cooled at an average cooling rate CR of 15° C./sec or more. If the average cooling rate CR is less than 15° C./sec, while the steel material is being cooled in the temperature region of 800 to 500° C., Cr—Nb nitrides will also precipitate at grain boundaries in the steel material, and in addition, $M_{23}C_6$-type carbides will also be formed at grain boundaries. Consequently, in an austenitic stainless steel material in which the contents of the elements in the chemical composition are within the range of the present embodiment and which satisfies Formula (1), in the residue the content of Nb will be more than 0.267 mass %, and/or the content of Cr will be more than 0.125%. In this case, the sensitization resistance properties of the austenitic stainless steel material will deteriorate.

Further, in a case where the contents of the elements in the chemical composition of the steel material are within the range of the present embodiment, and the content of Mo is 2.50 to 4.50%, the content of Co is 0.01 to 1.00%, and Formula (1) to Formula (3) are satisfied, if the average cooling rate CR is less than 15° C./sec, in the residue the content of Nb will be more than 0.245 mass % and/or the content of Cr will be more than 0.104%. In this case, the polythionic acid SCC resistance of the austenitic stainless steel material will decrease.

If the average cooling rate CR is 15° C./sec or more, while the steel material is being cooled in the temperature region of 800 to 500° C., excessive formation of Cr carbides in the steel material can be suppressed. Therefore, on the premise that the first condition and the second condition are satisfied, in an austenitic stainless steel material in which the contents of the elements in the chemical composition are within the range of the present embodiment and which satisfies Formula (1), the content of Nb in the residue will be, in mass %, 0.050 to 0.267%, and the content of Cr in the residue will be, in mass %, 0.125% or less. Therefore, the sensitization resistance properties of the austenitic stainless steel material can be improved.

Further, in a case where the contents of the elements in the chemical composition of the steel material are within the range of the present embodiment, and the content of Mo is 2.50 to 4.50%, the content of Co is 0.01 to 1.00%, and Formula (1) to Formula (3) are satisfied, if the average cooling rate CR is 15° C./sec or more, on the premise that the first condition and the second condition are satisfied, the content of Nb in the residue of the austenitic stainless steel material will be, in mass %, 0.065 to 0.245%, and the content of Cr in the residue will be 0.104% or less. Therefore, the polythionic acid SCC resistance of the austenitic stainless steel material is enhanced.

The austenitic stainless steel material of the present embodiment can be produced by the processes described above. The production method described above is one example of a method for producing the austenitic stainless steel material of the present embodiment. Therefore, a method for producing the austenitic stainless steel material of the present embodiment is not limited to the production method described above. As long as the content of each element in the chemical composition of the steel material is within the range of the present embodiment, the steel material satisfies Formula (1), the content of Nb in the residue is, in mass %, 0.050 to 0.267%, and the content of Cr in the residue is, in mass %, 0.125% or less, a method for producing the austenitic stainless steel material of the present embodiment is not limited to the production method described above.

As described above, in the austenitic stainless steel material of the present embodiment, the content of each element in the chemical composition is within the range of the present embodiment, and Formula (1) is satisfied. In addition, the content of Nb in the residue is, in mass %, 0.050 to 0.267%, and the content of Cr in the residue is, in mass %, 0.125% or less. Therefore, the austenitic stainless steel material of the present embodiment has excellent sensitization resistance properties.

In addition, in a case where the austenitic stainless steel material of the present embodiment also satisfies the aforementioned (I) to (II), that is, when the chemical composition contains Mo: 2.50 to 4.50% and Co: 0.01 to 1.00%, and also satisfies Formula (2) and Formula (3), and the content of Nb in the residue obtained by the extraction residue method is, in mass %, 0.065 to 0.245%, and the content of Cr in the residue is, in mass %, 0.104% or less, the austenitic stainless steel material of the present embodiment has sufficient polythionic acid SCC resistance and naphthenic acid corrosion resistance.

Example 1

Hereunder, advantageous effects of the austenitic stainless steel material of the present embodiment are described specifically by way of Examples. The conditions adopted in the following Examples are one example of conditions adopted for confirming the workability and advantageous effects of the austenitic stainless steel material of the present embodiment. Accordingly, the austenitic stainless steel material of the present embodiment is not limited to this one example of conditions.

Production of Austenitic Stainless Steel Material

Starting materials (ingots) having the chemical compositions shown in Table 1 were produced.

TABLE 1

| Test Number | Chemical Composition (unit is mass %; balance is Fe and impurities) | | | | | | | | | | | | |
|---|---|---|---|---|---|---|---|---|---|---|---|---|---|
| | Essential Elements | | | | | | | | | | | | |
| | C | Si | Mn | P | S | Cr | Ni | N | Nb | Mo | W | Optional Elements etc. | F1 |
| A1 | 0.009 | 0.38 | 1.47 | 0.025 | 0.0010 | 17.50 | 10.00 | 0.08 | 0.3 | 0.37 | 0.20 | | 4.3 |
| A2 | 0.011 | 0.39 | 1.48 | 0.023 | 0.0005 | 17.12 | 9.90 | 0.08 | 0.3 | 0.39 | 0.03 | Sn: 0.003, Ti: 0.04 | 3.7 |
| A3 | 0.016 | 0.39 | 1.48 | 0.022 | 0.0005 | 17.27 | 9.93 | 0.08 | 0.3 | 0.52 | 0.21 | Ti: 0.02, V: 0.04, B: 0.0014 | 7.6 |
| A4 | 0.009 | 0.38 | 1.47 | 0.025 | 0.0005 | 17.54 | 10.00 | 0.08 | 0.3 | 0.37 | 0.12 | V: 0.06, Al: 0.022 | 3.8 |
| A5 | 0.009 | 0.40 | 1.43 | 0.029 | 0.0005 | 17.22 | 9.92 | 0.08 | 0.3 | 0.38 | 0.08 | Sn: 0.004, Cu: 0.40, Co: 0.38 | 3.8 |
| A6 | 0.012 | 0.40 | 1.45 | 0.020 | 0.0005 | 17.21 | 9.92 | 0.08 | 0.3 | 0.38 | 0.24 | Ti: 0.05, Cu: 0.12, Co: 0.32, B: 0.0012 | 4.7 |
| A7 | 0.010 | 0.42 | 1.50 | 0.028 | 0.0005 | 17.11 | 9.88 | 0.08 | 0.3 | 0.38 | 0.02 | Sn: 0.002, Zn: 0.001, Ca: 0.0019 | 3.4 |
| A8 | 0.012 | 0.40 | 1.45 | 0.020 | 0.0005 | 17.22 | 9.96 | 0.08 | 0.3 | 0.55 | 0.04 | V: 0.10, Cu: 0.40, Al: 0.019, B: 0.0011, Ca: 0.0012 | 7.3 |
| A9 | 0.011 | 0.36 | 1.44 | 0.026 | 0.0007 | 17.34 | 9.96 | 0.09 | 0.3 | 0.36 | 0.23 | Sn: 0.003, As: 0.001, Co: 0.40 | 4.2 |
| A10 | 0.007 | 0.41 | 1.51 | 0.029 | 0.0006 | 17.08 | 9.92 | 0.09 | 0.3 | 0.44 | 0.28 | Sn: 0.066, Al: 0.028 | 6.3 |
| A11 | 0.008 | 0.40 | 1.48 | 0.023 | 0.0005 | 17.11 | 9.94 | 0.08 | 0.3 | 0.42 | 0.16 | B: 0.0020 | 5.1 |
| A12 | 0.012 | 0.38 | 1.47 | 0.021 | 0.0005 | 17.15 | 9.93 | 0.09 | 0.3 | 0.48 | 0.25 | Sb: 0.001, Sn: 0.003, Ca: 0.0023 | 7.0 |
| A13 | 0.009 | 0.44 | 1.45 | 0.024 | 0.0008 | 17.21 | 10.11 | 0.09 | 0.4 | 0.38 | 0.13 | Sn: 0.002 | 4.1 |
| A14 | 0.010 | 1.06 | 1.41 | 0.022 | 0.0005 | 17.13 | 9.98 | 0.09 | 0.3 | 0.41 | 0.17 | Sn: 0.001 | 5.0 |
| A15 | 0.013 | 0.42 | 1.44 | 0.023 | 0.0004 | 17.07 | 16.41 | 0.10 | 0.4 | 0.47 | 0.11 | | 5.9 |
| A16 | 0.007 | 0.35 | 1.42 | 0.021 | 0.0004 | 17.12 | 9.79 | 0.09 | 0.6 | 0.51 | 0.06 | Sn: 0.003, As: 0.001, Co: 0.40 | 6.5 |

TABLE 1-continued

Chemical Composition (unit is mass %; balance is Fe and impurities)

| Test Number | C | Si | Mn | P | S | Cr | Ni | N | Nb | Mo | W | Optional Elements etc. | F1 |
|---|---|---|---|---|---|---|---|---|---|---|---|---|---|
| A17 | 0.008 | 0.37 | 1.53 | 0.019 | 0.0006 | 17.14 | 9.81 | 0.09 | 0.4 | 1.16 | 0.09 | Sn: 0.002 | 20.9 |
| A18 | 0.007 | 0.40 | 1.49 | 0.025 | 0.0005 | 17.20 | 10.41 | 0.09 | 0.4 | 3.02 | 0.22 | | 62.4 |
| B1 | 0.017 | 0.38 | 1.47 | 0.032 | 0.0010 | 17.01 | 9.99 | 0.08 | 0.3 | 0 | 0 | Sn: 0.003 | −5.0 |
| B2 | 0.018 | 0.40 | 1.46 | 0.030 | 0.0010 | 16.50 | 13.84 | 0.08 | 0.4 | 0.12 | 0 | Ti: 0.05, Cu: 0.20 | −2.4 |
| B3 | 0.017 | 0.42 | 1.46 | 0.026 | 0.0010 | 18.49 | 10.20 | 0.08 | 0.3 | 0 | 0.12 | | −4.3 |
| B4 | 0.016 | 0.36 | 1.44 | 0.028 | 0.0010 | 18.21 | 14.86 | 0.09 | 0.3 | 0.12 | 0.14 | Sn: 0.004, Zn: 0.001 | −1.5 |
| B5 | 0.028 | 0.34 | 1.43 | 0.034 | 0.0010 | 17.21 | 10.00 | 0.05 | 0.5 | 0.41 | 0.04 | B: 0.0014 | 4.2 |
| B6 | 0.019 | 0.33 | 1.45 | 0.022 | 0.0010 | 17.98 | 9.78 | 0.15 | 0.2 | 0.11 | 0.02 | | −2.5 |
| B7 | 0.018 | 0.32 | 1.35 | 0.023 | 0.0006 | 17.13 | 9.89 | 0.09 | 0.2 | 0.15 | 0.35 | Sn: 0.006 | 0.4 |
| B8 | 0.017 | 0.48 | 1.01 | 0.022 | 0.0005 | 17.48 | 12.02 | 0.09 | 0.5 | 0.12 | 0.42 | | 0.1 |
| B9 | 0.019 | 0.46 | 1.41 | 0.024 | 0.0005 | 16.85 | 9.84 | 0.14 | 0.1 | 0.12 | 0.77 | | 2.2 |
| B10 | 0.019 | 0.58 | 1.32 | 0.026 | 0.0004 | 15.46 | 9.99 | 0.05 | 0.8 | 0.13 | 0.56 | Sn: 0.003 | 1.2 |
| B11 | 0.019 | 0.31 | 1.49 | 0.021 | 0.0005 | 16.87 | 9.85 | 0.09 | 0.2 | 1.18 | 0.26 | | 22.4 |
| B12 | 0.019 | 0.64 | 1.32 | 0.019 | 0.0006 | 17.01 | 9.79 | 0.09 | 0.1 | 2.52 | 0.32 | Sn: 0.005 | 52.1 |
| B13 | 0.019 | 0.22 | 1.29 | 0.024 | 0.0005 | 17.26 | 9.81 | 0.07 | 0.1 | 1.05 | 0.23 | | 19.4 |
| B14 | 0.019 | 0.57 | 1.48 | 0.026 | 0.0005 | 17.52 | 9.96 | 0.06 | 0.1 | 4.02 | 0.02 | | 83.2 |
| B15 | 0.018 | 0.40 | 1.55 | 0.024 | 0.0006 | 17.05 | 9.91 | 0.09 | 0.2 | 0.12 | 0.48 | Sn: 0.002 | 0.5 |
| B16 | 0.018 | 0.29 | 1.61 | 0.025 | 0.0005 | 15.38 | 10.05 | 0.08 | 0.1 | 2.53 | 0.18 | Sn: 0.003 | 51.5 |
| B17 | 0.019 | 0.44 | 1.45 | 0.028 | 0.0005 | 15.68 | 9.87 | 0.07 | 0.8 | 2.34 | 0.05 | | 46.5 |

In Table 1, "0" or a blank space indicates that the content of the corresponding element was less than the detection limit. When the content was less than the detection limit, the relevant element was regarded as not being contained in the chemical composition. For example, with regard to the content of Mo of Test Number B1, "0" means that when the content was rounded off to the second decimal place, the content was "0". Further, with regard to the content of W of Test Number B1, "0" means that when the content was rounded off to the second decimal place, the content was "0". Note that, in the "Optional Elements etc." column in Table 1, the contained optional elements or impurity elements as well as the respective contents (mass %) thereof are described. For example, it is shown that in Test Number A3, in the chemical composition, the content of Ti was 0.02%, the content of V was 0.04%, and the content of B was 0.0014%. Note that, with regard to Sn, As, Zn, Pb, and Sb which are impurity elements, in each of the test numbers, the content of Sn was 0 to 0.010%, the content of As was 0 to 0.010%, the content of Zn was 0 to 0.010%, the content of Pb was 0 to 0.010%, and the content of Sb was 0 to 0.010%.

Ingots having the chemical compositions shown in Table 1 and which had an outer diameter of 120 mm and a weight of 30 kg were produced using molten steel. Each ingot was subjected to hot forging to produce a starting material having a thickness of 30 mm. The temperature of the ingot before the hot forging was 1250° C. In addition, the starting material was subjected to hot rolling to produce an intermediate steel material (steel plate) having a thickness of 15 mm. The starting material temperature immediately before hot working (hot rolling) was 1250° C. For each test number, the finishing temperature of the intermediate steel material after hot rolling was 900° C. or more.

The intermediate steel material after the hot rolling was subjected to a heat treatment process to promote Cr—Nb nitrides. The $T_{max}$ of each test number in the heat treatment process to promote Cr—Nb nitrides was as shown in Table 2. In each of Test Numbers A1 to A18, and B1 to B6, B9, B10, and B13 to B17, the heat treatment temperature T was 1000° C. or more, and was $T_{max}$ or less. On the other hand, the heat treatment temperature T in Test Number B8 was less than 1000° C. Further, the heat treatment temperature T in Test Numbers B7, B11 and B12 was more than $T_{max}$.

In addition, the parameter to form Cr—Nb nitrides f2, and f1 and f3 of each test number were as shown in Table 2. The character "T" in the "f1≤f2" column in Table 2 indicates that f1≤f2. The character "F" indicates that f1>f2. The character "T" in the "f2≤f3" column in Table 2 indicates that f2≤f3. The character "F" indicates that f2>f3.

Further, the average cooling rate CR from 800 to 500° C. in the heat treatment process to promote Cr—Nb nitrides in Test Numbers A1 to A18, B1 to B5, B7 to B14, and B16 and B17 was 15° C./sec or more. On the other hand, the average cooling rate CR from 800 to 500° C. in Test Numbers B6 and B15 was 5° C./sec. Austenitic stainless steel materials were produced by the above process.

Evaluation Tests

The austenitic stainless steel materials produced by the production process described above were subjected to the following evaluation tests.

Preparation of Test Specimen Simulated Welded Joint with Higher Heat Input

Test specimens simulated welded joint with higher heat input which simulated welding with higher heat input were prepared by the following method using the produced austenitic stainless steel materials.

For each test number, an square type test specimen was taken that included the center position of the plate width and the center position of the plate thickness of the austenitic stainless steel material. The longitudinal direction of the square type test specimen was parallel with the longitudinal direction of the austenitic stainless steel material. The length of the square type test specimen was 100 mm. A cross section (transverse cross-section) perpendicular to the longitudinal direction of the square type test specimen was a rectangle with dimensions of 10 mm×10 mm. The center position of the transverse cross-section of the square type test specimen approximately coincided with the center position of the plate width and the center position of the plate thickness of the austenitic stainless steel material.

Figure 6:
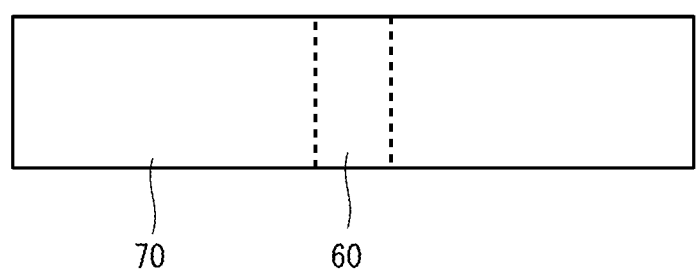
FIG. 6 is a side view of a test specimen simulated welded joint with higher heat input produced in the Examples.

A high frequency heat cycle apparatus was used to apply the following heat history to the square type test specimen. Specifically, referring to FIG. 6, the temperature of a central portion 60 having a width of 10 mm at the center position in the longitudinal direction of the square type test specimen (that is, a width of 5 mm on the right and left, respectively, from the center position in the longitudinal direction) was raised from normal temperature to 1400° C. at a rate of 70° C./sec in the atmosphere. In addition, the temperature was held at 1400° C. for 10 seconds. Thereafter, the square type test specimen was cooled to normal temperature at a cooling rate of 20° C./sec. A test specimen simulated welded joint with higher heat input was prepared by applying the heat history described above to the square type test specimen.

Long-Term Sensitization Treatment

The following long-term sensitization treatment was performed using the test specimen simulated welded joint with higher heat input. The test specimen simulated welded joint with higher heat input was charged into a heat treatment furnace. In the heat treatment furnace, the test specimen simulated welded joint with higher heat input was held for 10,000 hours at 550° C. in the atmosphere at atmospheric pressure (sensitization treatment). After 10,000 hours passed, the test specimen simulated welded joint with higher heat input was extracted from the heat treatment furnace and allowed to cool.

The following Strauss test and electrochemical potentiokinetic reactivation method were performed on the test specimen simulated welded joint with higher heat input that had undergone the long-term sensitization treatment.

Strauss Test (Sulfuric Acid-Copper Sulfate Corrosion Test)

A Strauss test in accordance with ASTM A262-15, Practice E, was performed as follows. From the test specimen simulated welded joint with higher heat input which was subjected to the long-term sensitization treatment, a plate-shaped test specimen having a thickness of 2 mm, a width of 10 mm, and a length of 80 mm was taken in a manner so that the central portion 60 was at the center position in the longitudinal direction. The plate-shaped test specimen was immersed in a copper sulfate test solution containing 16% sulfuric acid and boiled for 15 hours. Thereafter, the plate-shaped test specimen was taken out from the copper sulfate test solution. A bending test was performed on the plate-shaped test specimen that was taken out. In the bending test, the plate-shaped test specimen was bent 180° in the atmosphere around the center position in the longitudinal direction of the test specimen simulated welded joint with higher heat input. The bent part of the bent test specimen was then cut. The cut surface was observed with a 20× optical microscope. If a crack was observed, the length of the crack was determined. If a crack was not observed or if a crack was observed and the length of the crack was 100 μm or less, it was determined that the test specimen simulated welded joint with higher heat input had passed the Strauss test ("E" (Excellent) in Table 2). On the other hand, if a crack of more than 100 μm was observed, it was determined that the test specimen simulated welded joint with higher heat input had failed the Strauss test ("B" (Bad) in Table 2).

Electrochemical Potentiokinetic Reactivation Method

An electrochemical reactivation test in accordance with ASTM G108-94 was performed using the test specimen simulated welded joint with higher heat input that had been subjected to the long-term sensitization treatment. Specifically, a plate-shaped test specimen was taken from the central portion 60 (portion to which high heat was applied) of the test specimen simulated welded joint with higher heat input subjected to the long-term sensitization treatment. In the taken plate-shaped test specimen, a region other than a surface portion with an evaluation area of 100 mm$^2$ was masked. With the masked plate-shaped test specimen as an electrode, the plate-shaped test specimen was immersed in a 0.5 mol sulfuric acid+0.01 mol potassium thiocyanate solution with a volume of 200 cm$^3$ at a temperature of 30° C. Next, the plate-shaped test specimen was scanned in the noble direction from the spontaneous potential to 300 mV with a linear polarization at a polarization rate of 100 mV/min. After reaching 300 mV based on a saturated calomel electrode, scanning was immediately performed in the base direction to the original spontaneous potential. The current that flowed during application of a voltage in the noble direction (outward path) was measured. Then, the current that flowed during application of a voltage in the base direction (return path) was measured. Based on the obtained current values, the reactivation ratio (%) was defined as follows.

Reactivation ratio (maximum anodic current on return path/maximum anodic current on outward path)×100

The lower the reactivation ratio is, the lower the degree of sensitization (DOS) is, and the higher the sensitization resistance properties are. In the present Example, in a case where the reactivation ratio was 10% or less, it was determined that the test specimen had passed the test ("E" (Excellent) in Table 2). On the other band, if the reactivation ratio was more than 10%, it was determined that the test specimen had failed the test ("B" (Bad) in Table 2).

If the test specimen simulated welded joint with higher heat input subjected to the aforementioned long-term sensitization treatment passed the Strauss test, and the reactivation ratio was 10% or less, it was determined that the austenitic stainless steel material thereof had excellent sensitization resistance properties.

Test Results

The test results are shown in Table 2.

TABLE 2

| Test Number | F1 | Heat Treatment Process to Promote Cr—Nb nitrides | | | | | | Content of Nb in Residue (mass %) | Content of Cr in Residue (mass %) | Strauss Test | Electrochemical potentiokinetic reactivation method |
| | | $T_{max}$ (° C.) | f1 | f2 | f3 | f1 ≤ f2 | f2 ≤ f3 | | | | |
| --- | --- | --- | --- | --- | --- | --- | --- | --- | --- | --- | --- |
| A1 | 4.3 | 1221 | 760 | 1164 | 1680 | T | T | 0.159 | 0.074 | E | E |
| A2 | 3.7 | 1237 | 760 | 1167 | 1680 | T | T | 0.157 | 0.073 | E | E |

TABLE 2-continued

| Test Number | F1 | $T_{max}$ (° C.) | Heat Treatment Process to Promote Cr—Nb nitrides | | | | | Content of Nb in Residue (mass %) | Content of Cr in Residue (mass %) | Strauss Test | Electrochemical potentiokinetic reactivation method |
|---|---|---|---|---|---|---|---|---|---|---|---|
| | | | f1 | f2 | f3 | f1 ≤ f2 | f2 ≤ f3 | | | | |
| A3  | 7.6  | 1205 | 760  | 1222 | 1680 | T | T | 0.160 | 0.075 | E | E |
| A4  | 3.8  | 1229 | 760  | 1173 | 1680 | T | T | 0.152 | 0.070 | E | E |
| A5  | 3.8  | 1231 | 760  | 1166 | 1680 | T | T | 0.164 | 0.077 | E | E |
| A6  | 4.7  | 1214 | 760  | 1182 | 1680 | T | T | 0.165 | 0.078 | E | E |
| A7  | 3.4  | 1239 | 760  | 1226 | 1680 | T | T | 0.130 | 0.057 | E | E |
| A8  | 7.3  | 1219 | 760  | 1277 | 1680 | T | T | 0.141 | 0.063 | E | E |
| A9  | 4.2  | 1221 | 760  | 1151 | 1680 | T | T | 0.156 | 0.072 | E | E |
| A10 | 6.3  | 1203 | 760  | 1223 | 1680 | T | T | 0.154 | 0.071 | E | E |
| A11 | 5.1  | 1216 | 760  | 1232 | 1680 | T | T | 0.151 | 0.069 | E | E |
| A12 | 7.0  | 1205 | 760  | 1213 | 1680 | T | T | 0.160 | 0.075 | E | E |
| A13 | 4.1  | 1223 | 760  | 1209 | 1680 | T | T | 0.163 | 0.077 | E | E |
| A14 | 5.0  | 1218 | 760  | 1155 | 1680 | T | T | 0.175 | 0.084 | E | E |
| A15 | 5.9  | 1214 | 760  | 1289 | 1680 | T | T | 0.147 | 0.067 | E | E |
| A16 | 6.5  | 1193 | 760  | 1363 | 1680 | T | T | 0.171 | 0.082 | E | E |
| A17 | 20.9 | 1206 | 1200 | 1472 | 1900 | T | T | 0.151 | 0.069 | E | E |
| A18 | 62.4 | 1205 | 1520 | 1715 | 2050 | T | T | 0.162 | 0.077 | E | E |
| B1  | -5.0 | 1280 | 760  | 994  | 1680 | T | T | 0.155 | 0.072 | B | B |
| B2  | -2.4 | 1264 | 760  | 1192 | 1680 | T | T | 0.115 | 0.047 | B | B |
| B3  | -4.3 | 1264 | 760  | 1001 | 1680 | T | T | 0.175 | 0.084 | B | B |
| B4  | -1.5 | 1252 | 760  | 1036 | 1680 | T | T | 0.172 | 0.082 | B | B |
| B5  | 4.2  | 1222 | 760  | 1434 | 1680 | T | T | 0.078 | 0.025 | B | B |
| B6  | -2.5 | 1279 | 760  | 798  | 1680 | T | T | 0.161 | 0.129 | B | B |
| B7  | 0.4  | 1237 | 760  | 1188 | 1680 | T | T | 0.048 | 0.006 | B | B |
| B8  | 0.1  | 1211 | 760  | 996  | 1680 | T | T | 0.269 | 0.134 | B | B |
| B9  | 2.2  | 1205 | 760  | 732  | 1680 | F | T | 0.063 | 0.127 | B | B |
| B10 | 1.2  | 1172 | 760  | 1701 | 1680 | T | F | 0.046 | 0.002 | B | B |
| B11 | 22.4 | 1219 | 1200 | 1703 | 1900 | T | T | 0.042 | 0.003 | B | B |
| B12 | 52.1 | 1236 | 1520 | 2008 | 2050 | T | T | 0.036 | 0.001 | B | B |
| B13 | 19.4 | 1231 | 1200 | 1173 | 1900 | F | T | 0.213 | 0.131 | B | B |
| B14 | 83.2 | 1212 | 1520 | 2074 | 2050 | T | F | 0.047 | 0.006 | B | B |
| B15 | 0.5  | 1229 | 760  | 822  | 1680 | T | T | 0.247 | 0.128 | B | B |
| B16 | 51.5 | 1241 | 1520 | 1475 | 2050 | F | T | 0.186 | 0.129 | B | B |
| B17 | 46.5 | 1124 | 1200 | 1920 | 1900 | T | F | 0.045 | 0.002 | B | B |

Referring to Table 1 and Table 2, in each of Test Numbers A1 to A18 the content of each element in the chemical composition was appropriate and F1 satisfied Formula (1). In addition, the content of Nb in the residue was, in mass %, 0.050 to 0.267%, and the content of Cr in the residue was 0.125% or less. In addition, in the Strauss test, a crack of more than 100 μm was not observed. Furthermore, in the electrochemical potentiokinetic reactivation method, the reactivation ratio was 10% or less. Therefore, the austenitic stainless steel material of each of Test Numbers A1 to A18 exhibited excellent sensitization resistance properties even when subjected to a sensitization treatment for 10,000 hours at 550° C. after welding with higher heat input.

On the other hand, in Test Numbers B1 to B3, the content of Mo and/or the content of W was low. Consequently, in the Strauss test, a crack of more than 100 μm was observed. In addition, in the electrochemical potentiokinetic reactivation method, the reactivation ratio was more than 10%. In other words, when subjected to a sensitization treatment for 10,000 hours at 550° C. after welding with higher heat input, the sensitization resistance properties were low.

In Test Number B4, F1 did not satisfy Formula (1). Consequently, in the Strauss test, a crack of more than 100 un was observed. In addition, in the electrochemical potentiokinetic reactivation method, the reactivation ratio was more than 10%. In other words, when subjected to a sensitization treatment for 10,000 hours at 550° C. after welding with higher heat input, the sensitization resistance properties were low.

In Test Number B5, the content of C was high. Consequently, in the Strauss test, a crack of more than 100 μm was observed. In addition, in the electrochemical potentiokinetic reactivation method, the reactivation ratio was more than 10%. In other words, when subjected to a sensitization treatment for 10,000 hours at 550° C. after welding with higher heat input, the sensitization resistance properties were low.

In Test Number B6, F1 did not satisfy Formula (1). In addition, the average cooling rate CR from 800 to 500° C. in the heat treatment process to promote Cr—Nb nitrides was less than 15° C./sec. Consequently, the content of Cr in the residue was too high. Therefore, in the Strauss test, a crack of more than 100 μm was observed. In addition, the electrochemical potentiokinetic reactivation method, the reactivation ratio was more than 10%. In other words, when subjected to a sensitization treatment for 10,000 hours at 550° C. after welding with higher heat input, the sensitization resistance properties were low.

In Test Number B7, in the heat treatment process to promote Cr—Nb nitrides, the heat treatment temperature T was higher than $T_{max}$. Consequently, the content of Nb in the residue was too low. Therefore, in the Strauss test, a crack of more than 100 μm was observed. In addition, in the electrochemical potentiokinetic reactivation method, the reactivation ratio was more than 10%. In other words, when subjected to a sensitization treatment for 10,000 hours at 550° C. after welding with higher heat input, the sensitization resistance properties were low.

In Test Number B8, in the heat treatment process to promote Cr—Nb nitrides, the heat treatment temperature T was less than 1000° C. Consequently, the content of Nb in the residue and the content of Cr in the residue were too high. Therefore, in the Strauss test, a crack of more than 100 μm was observed, and in addition, in the electrochemical potentiokinetic reactivation method, the reactivation ratio was more than 10%. In other words, when subjected to a sensitization treatment for 10,000 hours at 550° C. after welding with higher heat input, the sensitization resistance properties were low.

In Test Number B9, although the chemical composition was appropriate and Formula (1) was satisfied, in the heat treatment process to promote Cr—Nb nitrides the parameter to form Cr—Nb nitrides f2 was less than f1. Consequently, the content of Cr in the residue was too high. As a result, a crack of more than 100 μm was observed in the Strauss test. In addition, in the electrochemical potentiokinetic reactivation method, the reactivation ratio was more than 10%. In other words, when subjected to a sensitization treatment for 10,000 hours at 550° C. after welding with higher heat input, the sensitization resistance properties were low.

In Test Number B10, although the chemical composition was appropriate and Formula (1) was satisfied, in the heat treatment process to promote Cr—Nb nitrides the parameter to form Cr—Nb nitrides f2 was more than f3. Consequently, the content of Nb in the residue was too low. As a result, a crack of more than 100 μm was observed in the Strauss test. In addition, in the electrochemical potentiokinetic reactivation method, the reactivation ratio was more than 10%. In other words, when subjected to a sensitization treatment for 10,000 hours at 550° C. after welding with higher heat input, the sensitization resistance properties were low.

In Test Number B11, in the heat treatment process to promote Cr—Nb nitrides, the heat treatment temperature T was higher than $T_{max}$. Consequently, the content of Nb in the residue was too low. Therefore, a crack of more than 100 μm was observed in the Strauss test. In addition, in the electrochemical potentiokinetic reactivation method, the reactivation ratio was more than 10%. In other words, when subjected to a sensitization treatment for 10,000 hours at 550° C. after welding with higher heat input, the sensitization resistance properties were low.

In Test Number B12, in the heat treatment process to promote Cr—Nb nitrides, the heat treatment temperature T was higher than $T_{max}$. Consequently, the content of Nb in the residue was too low. Therefore, a crack of more than 100 μm was observed in the Strauss test. In addition, in the electrochemical potentiokinetic reactivation method, the reactivation ratio was more than 10%. In other words, when subjected to a sensitization treatment for 10,000 hours at 550° C. after welding with higher heat input, the sensitization resistance properties were low.

In Test Number B13, although the chemical composition was appropriate and Formula (1) was satisfied, in the heat treatment process to promote Cr—Nb nitrides the parameter to form Cr—Nb nitrides f2 was less than f1. Consequently, the content of Cr in the residue was too high. As a result, a crack of more than 100 μm was observed in the Strauss test. In addition, in the electrochemical potentiokinetic reactivation method, the reactivation ratio was more than 10%. In other words, when subjected to a sensitization treatment for 10,000 hours at 550° C. after welding with higher heat input, the sensitization resistance properties were low.

In Test Number B14, although the chemical composition was appropriate and Formula (1) was satisfied, in the heat treatment process to promote Cr—Nb nitrides the parameter to form Cr—Nb nitrides f2 was more than f3. Consequently, the content of Nb in the residue was too low. As a result, a crack of more than 100 μm was observed in the Strauss test. In addition, in the electrochemical potentiokinetic reactivation method, the reactivation ratio was more than 10%. In other words, when subjected to a sensitization treatment for 10,000 hours at 550° C. after welding with higher heat input, the sensitization resistance properties were low.

In Test Number B15, although the chemical composition was appropriate and Formula (1) was satisfied, in the heat treatment process to promote Cr—Nb nitrides the average cooling rate CR from 800 to 500° C. was less than 15° C./sec. Consequently, the content of Cr in the residue was too high. As a result, a crack of more than 100 μm was observed in the Strauss test. In addition, in the electrochemical potentiokinetic reactivation method, the reactivation ratio was more than 10%. In other words, when subjected to a sensitization treatment for 10,000 hours at 550° C. after welding with higher heat input, the sensitization resistance properties were low.

In Test Number B16, although the chemical composition was appropriate and Formula (1) was satisfied, in the heat treatment process to promote Cr—Nb nitrides the parameter to form Cr—Nb nitrides f2 was less than f1. Consequently, the content of Cr in the residue was too high. As a result, a crack of more than 100 μm was observed in the Strauss test. In addition, in the electrochemical potentiokinetic reactivation method, the reactivation ratio was more than 10%. In other words, when subjected to a sensitization treatment for 10,000 hours at 550° C. after welding with higher heat input, the sensitization resistance properties were low.

In Test Number B17, although the chemical composition was appropriate and Formula (1) was satisfied, in the heat treatment process to promote Cr—Nb nitrides the parameter to form Cr—Nb nitrides f2 was more than f3. Consequently, the content of Nb in the residue was too low. As a result, a crack of more than 100 μm was observed in the Strauss test. In addition, in the electrochemical potentiokinetic reactivation method, the reactivation ratio was more than 10%. In other words, when subjected to a sensitization treatment for 10,000 hours at 550° C. after welding with higher heat input, the sensitization resistance properties were low.

Example 2

Production of Austenitic Stainless Steel Material

Starting materials (ingots) having the chemical compositions shown in Table 3 were produced.

TABLE 3

| Test Number | Chemical Composition (unit is mass %; balance is Fe and impurities) | | | | | | | | | | | | | | | |
|---|---|---|---|---|---|---|---|---|---|---|---|---|---|---|---|---|
| | Essential Elements | | | | | | | | | | | Optional Elements | | | | |
| | C | Si | Mn | P | S | Cr | Ni | Mo | W | N | Nb | Co | etc. | F1 | F2 | F3 |
| A1 | 0.010 | 0.29 | 1.04 | 0.025 | 0.0005 | 17.20 | 14.10 | 3.70 | 0.12 | 0.12 | 0.3 | 0.35 | | 76.7 | 11 | 0.35 |
| A2 | 0.009 | 0.72 | 1.47 | 0.023 | 0.0005 | 17.50 | 11.40 | 3.10 | 0.08 | 0.14 | 0.4 | 0.42 | Sn: 0.003, Ti: 0.04 | 63.4 | 8 | 0.39 |
| A3 | 0.008 | 0.46 | 1.48 | 0.024 | 0.0006 | 17.40 | 14.90 | 3.80 | 0.22 | 0.09 | 0.4 | 0.75 | Sn: 0.005, Ti: 0.08, V: 0.16 | 79.5 | 20 | 0.44 |

TABLE 3-continued

Chemical Composition (unit is mass %; balance is Fe and impurities)

| Test Number | \multicolumn{11}{c}{Essential Elements} | Optional Elements | | | |
|---|---|---|---|---|---|---|---|---|---|---|---|---|---|---|---|
| | C | Si | Mn | P | S | Cr | Ni | Mo | W | N | Nb | Co | etc. | F1 | F2 | F3 |
| A4 | 0.012 | 0.35 | 1.78 | 0.026 | 0.0004 | 17.10 | 12.10 | 3.60 | 0.16 | 0.11 | 0.3 | 0.38 | Cu: 1.20 | 74.8 | 14 | 0.34 |
| A5 | 0.009 | 0.42 | 1.65 | 0.024 | 0.0005 | 17.20 | 13.80 | 3.50 | 0.34 | 0.13 | 0.3 | 0.36 | Sn: 0.002, Al: 0.017 | 73.7 | 27 | 0.36 |
| A6 | 0.011 | 0.33 | 0.78 | 0.025 | 0.0007 | 17.30 | 12.80 | 3.70 | 0.14 | 0.10 | 0.3 | 0.27 | Al: 0.011, Ca: 0.0040 | 76.9 | 12 | 0.33 |
| A7 | 0.007 | 0.41 | 1.25 | 0.024 | 0.0004 | 17.40 | 14.20 | 3.60 | 0.25 | 0.13 | 0.3 | 0.14 | Sn: 0.004, B: 0.0008 | 75.3 | 19 | 0.37 |
| A8 | 0.012 | 0.56 | 1.15 | 0.022 | 0.0005 | 17.30 | 13.80 | 3.70 | 0.18 | 0.09 | 0.4 | 0.31 | As: 0.001, Sn: 0.003 | 77.1 | 15 | 0.37 |
| A9 | 0.008 | 0.61 | 1.42 | 0.019 | 0.0005 | 17.20 | 13.70 | 3.80 | 0.22 | 0.09 | 0.4 | 0.25 | Ca: 0.0030 | 79.5 | 17 | 0.40 |
| A10 | 0.010 | 0.38 | 1.33 | 0.023 | 0.0006 | 17.10 | 14.20 | 3.80 | 0.19 | 0.10 | 0.3 | 0.22 | Sn: 0.002 | 79.3 | 15 | 0.34 |
| A11 | 0.011 | 0.44 | 1.57 | 0.025 | 0.0005 | 17.10 | 14.30 | 3.70 | 0.20 | 0.13 | 0.3 | 0.26 | V: 0.14, Cu: 0.08 | 77.2 | 16 | 0.36 |
| A12 | 0.012 | 0.41 | 1.52 | 0.022 | 0.0005 | 17.40 | 13.90 | 3.40 | 0.18 | 0.11 | 0.3 | 0.33 | Ti: 0.15, Al: 0.024, Ca: 0.0020 | 70.5 | 15 | 0.33 |
| A13 | 0.019 | 0.54 | 1.42 | 0.026 | 0.0005 | 17.10 | 13.70 | 3.10 | 0.12 | 0.14 | 0.2 | 0.33 | Sn: 0.005 | 63.6 | 10 | 0.23 |
| B1 | 0.018 | 0.74 | 1.13 | 0.028 | 0.0005 | 17.50 | 14.30 | 3.80 | 0.86 | 0.14 | 0.6 | 0.45 | Sn: 0.006, Sb: 0.001, V: 0.08 | 83.3 | 65 | 0.69 |
| B2 | 0.014 | 0.66 | 1.52 | 0.026 | 0.0004 | 17.10 | 13.60 | 0.30 | 0.18 | 0.11 | 0.2 | 0.12 | V: 0.08 | 2.6 | 14 | 0.17 |
| B3 | 0.012 | 0.34 | 0.74 | 0.024 | 0.0005 | 17.20 | 11.50 | 1.86 | 0.05 | 0.14 | 0.4 | 0.25 | Cu: 0.68, Al: 0.018, B: 0.0082 | 36.0 | 5 | 0.36 |
| B4 | 0.019 | 0.65 | 0.38 | 0.022 | 0.0006 | 17.10 | 12.20 | 2.77 | 0.14 | 0.14 | 0.2 | 0.13 | B: 0.0040 | 56.5 | 11 | 0.18 |
| B5 | 0.016 | 0.48 | 1.32 | 0.024 | 0.0005 | 17.20 | 13.80 | 3.12 | 0.01 | 0.11 | 0.3 | 0.12 | Sn: 0.002 | 63.4 | 1 | 0.32 |
| B6 | 0.012 | 0.89 | 1.11 | 0.028 | 0.0005 | 17.40 | 14.10 | 4.12 | 0.85 | 0.14 | 0.4 | 0.91 | Sn: 0.001 | 90.2 | 67 | 0.49 |
| B7 | 0.017 | 0.66 | 1.24 | 0.026 | 0.0006 | 17.30 | 14.20 | 3.57 | 0.14 | 0.14 | 0.1 | 0.22 | Sn: 0.005 | 74.0 | 11 | 0.14 |
| B8 | 0.012 | 0.72 | 1.08 | 0.021 | 0.0005 | 17.20 | 13.40 | 3.62 | 0.67 | 0.13 | 0.7 | 0.18 | | 78.2 | 50 | 0.79 |
| B9 | 0.018 | 0.62 | 1.28 | 0.024 | 0.0005 | 17.10 | 13.10 | 3.05 | 0.16 | 0.12 | 0.2 | 0.24 | | 62.7 | 13 | 0.24 |
| B10 | 0.019 | 0.43 | 1.34 | 0.025 | 0.0005 | 17.60 | 14.20 | 3.64 | 0.80 | 0.13 | 0.1 | 0.04 | | 79.4 | 59 | 0.22 |
| B11 | 0.014 | 0.57 | 1.22 | 0.025 | 0.0004 | 17.30 | 12.50 | 3.58 | 0.18 | 0.14 | 0.5 | 0.41 | Sn: 0.004 | 74.5 | 15 | 0.52 |
| B12 | 0.019 | 0.44 | 1.45 | 0.024 | 0.0005 | 17.11 | 11.78 | 2.52 | 0.76 | 0.06 | 0.1 | 0.09 | | 54.7 | 56 | 0.21 |
| B13 | 0.019 | 0.50 | 1.37 | 0.025 | 0.0005 | 17.74 | 12.91 | 4.37 | 0.82 | 0.05 | 0.1 | 0.02 | Sn: 0.006 | 95.5 | 60 | 0.21 |
| B14 | 0.011 | 0.38 | 1.18 | 0.021 | 0.0006 | 17.26 | 13.91 | 0.56 | 0.26 | 0.10 | 0.3 | 0.28 | | 8.8 | 20 | 0.35 |

In Table 3, a blank space indicates that the content of the corresponding element was less than the detection limit. When the content was less than the detection limit, the relevant element was regarded as not being contained in the chemical composition. Note that, in the "Optional Elements etc." column in Table 3, the contained optional elements or impurity elements as well as the respective contents (mass %) thereof are described. For example, it is shown that in Test Number A3, in the chemical composition, the content of Ti was 0.08%, the content of V was 0.16%, and the content of Sn that is an impurity was 0.005%. Note that, with regard to Sn, As, Zn, Pb, and Sb which are impurity elements, in each of the test numbers, the content of Sn was 0 to 0.010%, the content of As was 0 to 0.010%, the content of Zn was 0 to 0.010%, the content of Pb was 0 to 0.010%, and the content of Sb was 0 to 0.010%.

Ingots having the chemical compositions shown in Table 3 and which had an outer diameter of 120 mm and a weight of 30 kg were produced using molten steel. Each ingot was subjected to hot forging to produce a starting material having a thickness of 30 mm. The temperature of the ingot before the hot forging was 1150° C. In addition, the starting material was subjected to hot rolling to produce a steel material (steel plate) having a thickness of 15 mm. The starting material temperature before hot working (hot rolling) was 1150° C. The finishing temperature of the steel material after hot rolling was 900° C. or more.

The steel material after the hot rolling was subjected to a heat treatment process to promote Cr—Nb nitrides. The $T_{max}$ of each test number in the heat treatment process to promote Cr—Nb nitrides was as shown in Table 4. In Test Numbers A1 to A13, B1 to B8, and B11 to 14, the heat treatment temperature T was 1000° C. or more and was $T_{max}$ or less. On the other hand, in Test Number B9, the heat treatment temperature T was more than $T_{max}$. Further, in Test Number B10, the heat treatment temperature T was less than 1000° C.

In addition, the parameter to form Cr—Nb nitrides f2, and f1 and f3 of each test number were as shown in Table 4. The character "T" in the "f1≤f2" column in Table 4 indicates that f1≤f2. The character "F" indicates that f1>f2. The character "T" in the "f2≤f3" column in Table 4 indicates that f2≤f3. The character "F" indicates that f2>f3.

Further, the average cooling rate CR from 800 to 500° C. in the heat treatment process to promote Cr—Nb nitrides in Test Numbers A1 to A13, B1 to B10, and B12 to B14 was 15° C./sec or more. On the other hand, the average cooling rate CR from 800 to 500° C. in Test Number B11 was less than 15° C./sec. Austenitic stainless steel materials were produced by the above process.

Naphthenic Acid Corrosion Resistance Evaluation Test

A test specimen having a thickness of 2 mm, a width of 10 mm, and a length of 30 mm was taken from the center position of the width and at the center position of the plate thickness of the austenitic stainless steel material of each test number. The longitudinal direction of the test specimen was parallel with the longitudinal direction (rolling direction) of the steel material. The taken test specimen was immersed in a 100% cyclohexanecarboxylic acid solution at 200° C. for 720 hours under normal pressure. After immersion for 720 hours, the test specimen was ultrasonically cleaned using acetone for 3 minutes.

The difference between the mass of the test specimen before the test and the mass of the test specimen after ultrasonic cleaning was calculated as the corrosion loss. In addition, the corrosion rate (mm/year) was determined based on the surface area, specific gravity, and test time of the test specimen. If the corrosion rate was 0.01 mm/year or less, it was determined that the austenitic stainless steel material is excellent in naphthenic acid corrosion resistance (described as "E" in the "Naphthenic Acid Corrosion Resistance" column in Table 4). On the other hand, if the corrosion rate was more than 0.01 mm/year, it was determined that the naphthenic acid corrosion resistance is low (described as "B" in the "Naphthenic Acid Corrosion Resistance" column in Table 4).

Preparation of Test Specimen Simulated Welded Joint with Higher Heat Input

Test specimen simulated welded joint with higher heat inputs which simulated a welded joint produced by welding with higher heat input were prepared by the following method using the produced austenitic stainless steel materials.

For each test number, an square type test specimen was taken that included the center position of the plate width and the center position of the plate thickness of the austenitic stainless steel material. The longitudinal direction of the square type test specimen was parallel with the longitudinal direction of the austenitic stainless steel material. The length of the square type test specimen was 100 mm. A cross section (transverse cross-section) perpendicular to the longitudinal direction of the square type test specimen was a rectangle with dimensions of 10 mm×10 mm. The center position of the transverse cross-section of the square type test specimen approximately coincided with the center position of the plate width and the center position of the plate thickness of the austenitic stainless steel material.

A high frequency heat cycle apparatus was used to apply the following heat history to the square type test specimen. Specifically, referring to FIG. 6, the temperature of a portion 60 having a width of 10 mm at a center position in the longitudinal direction of the square type test specimen was raised from normal temperature to 1350° C. at a rate of 100° C./sec in the atmosphere. In addition, the temperature was held at 1350° C. for 1 to 60 seconds. Thereafter, the square type test specimen was cooled to normal temperature at a cooling rate of 20° C./sec. A test specimen simulated welded joint with higher heat input 50 was prepared by applying the heat history described above to the square type test specimen.

Average Grain Sizes R1 and R2 Measurement Test

The average grain sizes R1 and R2 were measured by the following method using the test specimen simulated welded joint with higher heat input 50. The region 60 of the portion with a width of 10 mm at the center position in the longitudinal direction of the test specimen simulated welded joint with higher heat input 50 corresponds to a range Dref (simulated HAZ microstructure) of the HAZ of the welded joint. Therefore, the region 60 was identified as a range Dref (simulated HAZ microstructure) 60 of the HAZ. A sample in which the surface of the range Dref 60 was adopted as the observation surface was taken. The observation surface was mirror-polished. Thereafter, the grain size number in an arbitrary three visual fields was determined by an intercept method in accordance with JIS G 0551 (2013). The size of each visual field was 100 μm×100 μm. The arithmetic mean value of the thus-determined three grain size numbers was determined, and was defined as the average grain size number. The average grain size R1 (μm) was determined based on the obtained average grain size number.

Similarly, a portion from an end to a position at 25 mm in the longitudinal direction of the test specimen simulated welded joint with higher heat input 50 was identified as a normal portion 70. In the normal portion 70, the average grain size R2 was measured by the following method. A sample was taken in which the surface of the normal portion 70 of the test specimen simulated welded joint with higher heat input 50 was adopted as the observation surface. The observation surface was mirror-polished. Thereafter, the grain size number in an arbitrary three visual fields was determined by an intercept method in accordance with JIS G 0551 (2013). The size of each visual field was 100 μm×100 μm. The arithmetic mean value of the thus-determined three grain size numbers was determined, and was defined as the average grain size number. The average grain size R2 (μm) was determined based on the obtained average grain size number.

The thus-determined average grain size R1 in the range Dref 60 and average grain size R2 in the normal portion 70 were used to determine R1/R2. The value determined for R1/R2 is shown in the "R1/R2" column in Table 4. Further, the character "T" in the "Formula (4)" column in Table 4 means that R1/R2 was 4.8 or less and satisfied Formula (4). On the other hand, the character "F" in the "Formula (4)" column in Table 4 means that R1/R2 was more than 4.8 and did not satisfy Formula (4).

Polythionic Acid SCC Resistance Evaluation Test

The following long-term sensitization treatment test was performed using the test specimen simulated welded joint with higher heat input. The test specimen simulated welded joint with higher heat input was charged into a heat treatment furnace. In the heat treatment furnace, the test specimen simulated welded joint with higher heat input was held for 10,000 hours at 550° C. in the atmosphere at atmospheric pressure (sensitization treatment). After 10,000 hours passed, the test specimen simulated welded joint with higher heat input was extracted from the heat treatment furnace and allowed to cool.

A plate-shaped test specimen having a thickness of 2 mm, a width of 10 mm, and a length of 75 mm was taken from the test specimen simulated welded joint with higher heat input after the long-term sensitization treatment in a manner so that the range Dref 60 was at the center position in the longitudinal direction. A polythionic acid SCC resistance evaluation test was carried out by the following method using the taken plate-shaped test specimen. The plate-shaped test specimen was bent around a punch having an inner radius of 5 mm to form a U-bend shape. The U-bend-shaped test specimen was immersed for 100 hours at normal temperature in a 1% $K_2S_4O_6$ liquid solution adjusted to PH=2 using sulfuric acid. After immersion, the bent part of the bent test specimen was cut in a direction perpendicular to the longitudinal direction, and the cut surface was observed with a 20× optical microscope. If a crack was observed, the depth of the crack in the cut surface was determined. If a crack was not observed, it was determined that the steel material is very good in polythionic acid SCC resistance (described as "E" (Excellent) in the "PTASCC Resistance" column in Table 4). If a crack was observed in the cut surface but the depth of the crack was less than 20 μm, it was determined that the steel material is good in polythionic acid SCC resistance (described as "G" (Good) in the "PTASCC Resistance" column in Table 4). If a crack was observed in the cut surface and the depth of the crack was 20 μm or more, it was determined that the polythionic acid SCC resistance was low (described as "B" (bad) in the "PTASCC Resistance" column in Table 4).

Liquation Cracking Resistance Evaluation Test

The center position (that is, within the range Dref 60) in the longitudinal direction of the test specimen simulated welded joint with higher heat input 50 was cut in a direction perpendicular to the longitudinal direction. The cut surface was adopted as the observation surface. The observation surface was etched with mixed acid. An arbitrary three visual fields (each visual field was 250 μm×250 μm) on the etched observation surface were observed with a 400× optical microscope. In the observed three visual fields, the presence or absence of partial liquation traces at grain boundaries was determined.

In the cut surface of the three visual fields, among partial liquation traces generated at the grain boundaries, if partial liquation traces having a length of 25 μm or more were not observed, it was determined that the liquation cracking resistance was extremely high (described as "E" (Excellent) in the "Liquation Cracking Resistance" column in Table 4). If partial liquation traces having a length of 25 μm or more were observed among the partial liquation traces generated at the grain boundaries, but partial liquation traces having a length of 50 μm or more were not observed, it was determined that the liquation cracking resistance was high (described as "G" (Good) in the "Liquation Cracking Resistance" column in Table 4). If even one partial fusion trace having a length of 50 μm or more was observed, it was determined that the liquation cracking resistance was low (described as "B" (Bad) in the "Liquation Cracking Resistance" column in Table 4).

Test Results

The test results are shown in Table 4.

TABLE 4

| Test Number | Heat Treatment Process to Promote Cr—Nb nitrides | | | | | | Content in Residue (mass %) | | R1/R2 | Formula (4) | Naphthenic Acid Corrosion Resistance | PTASCC Resistance | Liquation Cracking Resistance |
|---|---|---|---|---|---|---|---|---|---|---|---|---|---|
| | $T_{max}$ (° C.) | f1 | f2 | f3 | f1 ≤ f2 | f2 ≤ f3 | Nb | Cr | | | | | |
| A1 | 1198 | 1520 | 1804 | 2050 | T | T | 0.127 | 0.070 | 1.8 | T | E | E | E |
| A2 | 1208 | 1520 | 1759 | 2050 | T | T | 0.125 | 0.069 | 2.5 | T | E | E | E |
| A3 | 1188 | 1520 | 1794 | 2050 | T | T | 0.135 | 0.076 | 3.1 | T | E | E | E |
| A4 | 1202 | 1520 | 1827 | 2050 | T | T | 0.119 | 0.064 | 3.4 | T | E | E | E |
| A5 | 1199 | 1520 | 1805 | 2050 | T | T | 0.121 | 0.066 | 3.7 | T | E | E | E |
| A6 | 1200 | 1520 | 1765 | 2050 | T | T | 0.134 | 0.075 | 2.7 | T | E | E | E |
| A7 | 1197 | 1520 | 1730 | 2050 | T | T | 0.140 | 0.079 | 4.1 | T | E | E | E |
| A8 | 1197 | 1520 | 1793 | 2050 | T | T | 0.129 | 0.072 | 3.5 | T | E | E | E |
| A9 | 1191 | 1520 | 1824 | 2050 | T | T | 0.126 | 0.070 | 4.2 | T | E | E | E |
| A10 | 1197 | 1520 | 1814 | 2050 | T | T | 0.125 | 0.069 | 3.2 | T | E | E | E |
| A11 | 1197 | 1520 | 1862 | 2050 | T | T | 0.115 | 0.061 | 3.9 | T | E | E | E |
| A12 | 1206 | 1520 | 1739 | 2050 | T | T | 0.132 | 0.074 | 2.9 | T | E | E | E |
| A13 | 1222 | 1520 | 1837 | 2050 | T | T | 0.098 | 0.049 | 5.9 | F | E | G | G |
| B1 | 1162 | 1520 | 1990 | 2050 | T | T | 0.153 | 0.089 | 4.0 | T | E | E | B |
| B2 | 1243 | 760 | 986 | 1680 | T | T | 0.074 | 0.042 | 4.3 | T | B | B | E |
| B3 | 1179 | 1200 | 1572 | 1900 | T | T | 0.124 | 0.069 | 3.8 | T | B | E | E |
| B4 | 1232 | 1520 | 1655 | 2050 | T | T | 0.068 | 0.026 | 3.8 | T | E | B | E |
| B5 | 1215 | 1520 | 1766 | 2050 | T | T | 0.092 | 0.036 | 4.5 | T | E | B | E |
| B6 | 1171 | 1520 | 1982 | 2050 | T | T | 0.096 | 0.048 | 3.0 | T | E | E | B |
| B7 | 1219 | 1520 | 1736 | 2050 | T | T | 0.076 | 0.042 | 2.2 | T | E | B | E |
| B8 | 1159 | 1520 | 1995 | 2050 | T | T | 0.160 | 0.095 | 4.3 | T | E | E | B |
| B9 | 1222 | 1520 | 2005 | 2050 | T | T | 0.063 | 0.023 | 4.5 | T | E | B | E |
| B10 | 1204 | 1520 | 1554 | 2050 | T | T | 0.175 | 0.105 | 4.3 | T | E | B | E |
| B11 | 1188 | 1520 | 1913 | 2050 | T | T | 0.247 | 0.181 | 3.4 | T | E | B | E |
| B12 | 1228 | 1520 | 1499 | 2050 | F | T | 0.164 | 0.111 | 4.2 | T | E | B | E |
| B13 | 1190 | 1520 | 2064 | 2050 | T | F | 0.039 | 0.007 | 4.5 | T | E | B | E |
| B14 | 1195 | 760 | 1245 | 1680 | T | T | 0.129 | 0.071 | 4.1 | T | B | E | E |

Referring to Table 3 and Table 4, in Test Numbers A1 to A13 the content of each element in the chemical composition was appropriate, and Formula (1) to Formula (3) were satisfied. In addition, the content of Nb in the residue was, in mass %, 0.065 to 0.245%, and the content of Cr was, in mass %, 0.104% or less. Therefore, the steel materials of Test Numbers A1 to A13 were excellent in polythionic acid SCC resistance and naphthenic acid corrosion resistance. In addition, the steel materials were also excellent in liquation cracking resistance.

Further, in Test Numbers A11 to A12, the average grain size R1 of the range Dref and the average grain size R2 of the normal portion in the test specimen simulated welded joint with higher heat input satisfied Formula (4). Therefore, the polythionic acid SCC resistance was extremely high, and the liquation cracking resistance was extremely high.

On the other hand, in Test Number B1, although the content of each element in the chemical composition was appropriate, F2 was more than the upper limit of Formula (2), and F3 was more than the upper limit of Formula (3). As a result, the liquation cracking resistance was low.

In Test Number B2, the content of Mo was low. In addition, F3 was less than the lower limit of Formula (3). Consequently, the polythionic acid SCC resistance and naphthenic acid corrosion resistance were low.

In Test Number B3, the content of Mo was low. Consequently, the naphthenic acid corrosion resistance was low.

In Test Number B4, F3 was less than the lower limit of Formula (3). Consequently, the polythionic acid SCC resistance was low.

In Test Number B5, F2 was less than the lower limit of Formula (2). Consequently, the polythionic acid SCC resistance was low.

In Test Number B6, F2 was more than the upper limit of Formula (2). As a result, the liquation cracking resistance was low.

In Test Number B7, F3 was less than the lower limit of Formula (3). As a result, the polythionic acid SCC resistance was low.

In Test Number B8, F3 was more than the upper limit of Formula (3). As a result, the liquation cracking resistance was low.

In Test Number B9, the heat treatment temperature T in the heat treatment process to promote Cr—Nb nitrides was more than $T_{max}$. Consequently, the content of Nb in the residue was too low. As a result, the polythionic acid SCC resistance was low.

In Test Number B10, the heat treatment temperature T in the heat treatment process to promote Cr—Nb nitrides was too low. Consequently, the content of Cr in the residue was high. As a result, the liquation cracking resistance was low.

In Test Number B11, in the heat treatment process to promote Cr—Nb nitrides, the average cooling rate CR was too slow. Consequently, the content of Nb in the residue was high, and the content of Cr in the residue was high. As a result, the polythionic acid SCC resistance was low.

In Test Number B12, although the chemical composition was appropriate and Formula (1) to Formula (3) were satisfied, in the heat treatment process to promote Cr—Nb nitrides the parameter to form Cr—Nb nitrides f2 was less than f1. Consequently, the content of Cr in the residue was too high. As a result, the polythionic acid SCC resistance was low.

In Test Number B13, although the chemical composition was appropriate and Formula (1) to Formula (3) were satisfied, in the heat treatment process to promote Cr—Nb nitrides the parameter to form Cr—Nb nitrides f2 was more than f3. Consequently, the content of Nb in the residue was too low. As a result, the polythionic acid SCC resistance was low.

In Test Number B14, the content of Mo was low. Consequently, the naphthenic acid corrosion resistance was low.

Embodiment of the present invention have been described above. However, the foregoing embodiments are merely examples for implementing the present invention. Accordingly, the present invention is not limited to the above embodiments, and the above embodiments can be appropriately modified and implemented within a range that does not deviate from the gist of the present invention.

REFERENCE SIGNS LIST

1 Welded joint
100 Austenitic stainless steel material (base metal)
101 Heat affected zone (HAZ)
102 Normal portion
200 Weld metal
200E Fusion line

The invention claimed is:
1. An austenitic stainless steel material, comprising: a chemical composition consisting of, in mass %,
C: 0.020% or less,
Si: 1.50% or less,
Mn: 2.00% or less,
P: 0.045% or less,
S: 0.0300% or less,
Cr: 15.00 to 25.00%,
Ni: 9.00 to 20.00%,
N: 0.05 to 0.15%,
Nb: 0.1 to 0.8%,
Mo: 0.10 to 4.50%,
W: 0.01 to 1.00%,
Ti: 0 to 0.50%,
Ta: 0 to 0.50%,
V: 0 to 1.00%,
Zr: 0 to 0.10%,
Hf: 0 to 0.10%,
Cu: 0 to 2.00%,
Co: 0 to 1.00%,
sol. Al: 0 to 0.030%,
B: 0 to 0.0100%,
Ca: 0 to 0.0200%,
Mg: 0 to 0.0200%,
rare earth metal: 0 to 0.100%,
Sn: 0 to 0.010%,
As: 0 to 0.010%,
Zn: 0 to 0.010%,
Pb: 0 to 0.010%, and
Sb: 0 to 0.010%,
with the balance being Fe and impurities, and
satisfying Formula (1),
wherein:
a content of Nb in a residue obtained by an extraction residue method is, in mass %, 0.050 to 0.267%, and a content of Cr in the residue is, in mass %, 0.125% or less;

$$21.9Mo+5.9W-5.0\geq 0 \tag{1}$$

where, a content (mass %) of a corresponding element in the chemical composition is substituted for each symbol of an element in Formula (1).

2. The austenitic stainless steel material according to claim 1, wherein
the chemical composition contains:
Mo: 2.50 to 4.50%, and
Co: 0.01 to 1.00%,
and further satisfies Formula (2) and Formula (3), and
a content of Nb in the residue obtained by the extraction residue method is, in mass %, 0.065 to 0.245%, and a content of Cr in the residue is, in mass %, 0.104% or less;

$$2\leq 73W+5Co\leq 60 \tag{2}$$

$$0.20\leq Nb+0.1W\leq 0.58 \tag{3}.$$

3. The austenitic stainless steel material according to claim 1, wherein
the chemical composition contains at least one or more elements belonging to any group among a first group to a fifth group:
first group:
Ti: 0.01 to 0.50%,
Ta: 0.01 to 0.50%,
V: 0.01 to 1.00%,
Zr: 0.01 to 0.10%, and
Hf: 0.01 to 0.10%;

second group:
Cu: 0.01 to 2.00%, and
Co: 0.01 to 1.00%;
third group:
sol. Al: 0.001 to 0.030%;
fourth group:
B: 0.0001 to 0.0100%; and
fifth group:
Ca: 0.0001 to 0.0200%,
Mg: 0.0001 to 0.0200%, and
rare earth metal: 0.001 to 0.100%.

4. The austenitic stainless steel material according to claim 2, wherein
the chemical composition contains at least one or more elements belonging to any group among a first group to a fifth group:
first group:
Ti: 0.01 to 0.50%,
Ta: 0.01 to 0.50%,
V: 0.01 to 1.00%,
Zr: 0.01 to 0.10%, and
Hf: 0.01 to 0.10%;
second group:
Cu: 0.01 to 2.00%, and
Co: 0.01 to 1.00%;
third group:
sol. Al: 0.001 to 0.030%;
fourth group:
B: 0.0001 to 0.0100%; and
fifth group:
Ca: 0.0001 to 0.0200%,
Mg: 0.0001 to 0.0200%, and
rare earth metal: 0.001 to 0.100%.

5. A welded joint, comprising:
a pair of the austenitic stainless steel materials according to claim 2, and
a weld metal arranged between the pair of the austenitic stainless steel materials,
wherein,
when, in a cross section of the austenitic stainless steel material that is perpendicular to an extending direction of the weld metal, an average grain size in a range of 200 μm in a width direction of the weld metal from a fusion line that is inside a heat-affected zone is defined as an "average grain size R1", and an average grain size of a portion other than the heat-affected zone is defined as an "average grain size R2",
the average grain size R1 and the average grain size R2 satisfy Formula (4):

$$R1/R2 \leq 4.8 \tag{4}$$

* * * * *